US006285947B1

(12) United States Patent
Divljakovic et al.

(10) Patent No.: US 6,285,947 B1
(45) Date of Patent: Sep. 4, 2001

(54) PROGNOSTICATION OF FUTURE FAILURE OF AN ENGINE INDICATOR PARAMETER

(75) Inventors: Vojislav Divljakovic, Fond du Lac; Michael J. Lemancik, Oshkosh, both of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/428,690

(22) Filed: Oct. 28, 1999

(51) Int. Cl.[7] ............................. G01M 15/00; F02D 41/26
(52) U.S. Cl. ............................ 701/110; 701/111; 701/115
(58) Field of Search ......................... 123/406.24, 406.25, 123/406.27, 406.28, 406.26, 406.38, 406.33, 436; 701/102, 103, 110, 111, 115; 73/116, 117.3

(56) References Cited

U.S. PATENT DOCUMENTS

| 4,336,593 | * | 6/1982 | Takase | 701/115 |
|---|---|---|---|---|
| 4,660,519 | * | 4/1987 | Stocker et al. | 701/110 |
| 4,903,210 | * | 2/1990 | Akasu | 701/111 |
| 5,263,364 | * | 11/1993 | Nakayama et al. | 701/110 |
| 5,633,456 | | 5/1997 | Stander | 73/116 |
| 5,646,340 | | 7/1997 | Gee et al. | 73/116 |
| 5,745,382 | | 4/1998 | Vilim et al. | 706/16 |
| 5,852,793 | | 12/1998 | Board et al. | 702/56 |
| 5,954,784 | * | 9/1999 | Inada et al. | 123/436 |

OTHER PUBLICATIONS

"Random Data, Analysis and Measurement Procedures" by Bendat and Pierson (2nd Edition) published by John Wiley & Sons, paragraph 6.1.2 (No Date).

* cited by examiner

*Primary Examiner*—Willis R. Wolfe
(74) *Attorney, Agent, or Firm*—William D. Lanyi

(57) ABSTRACT

Power spectral densities are taken at periodic intervals for preselected indicator parameters and these power spectral density profiles are compared to a reference magnitude of a power spectral density profile for purposes of prognosticated future failures. The power spectral density profile can be for any one of a plurality of indicator profiles, such as an accelerometer output, the output of a pressure sensor, or a voltage output from an ignition system.

19 Claims, 13 Drawing Sheets

PROGNOSTICATION OF FUTURE FAILURE OF AN ENGINE INDICATOR PARAMETER

BACKGROUND OF THE INVENTION

1. Field of the Invention

The present invention is generally related to a means for characterizing the operation of an apparatus and prognosticating a condition of an apparatus and, more particularly, to a method by which a marine propulsion system can be monitored in order to both diagnose its current operating condition and to predict future failures before they become catastrophic.

2. Description of the Prior Art

In any complex system or apparatus, it is often desirable to monitor certain parameters to determine if the apparatus is operating in a proper manner. For example, in an automobile, oil pressure and coolant temperature are monitored continually. If oil pressure drops below a predetermined threshold magnitude, an alarm signal is provided to inform the operator that low oil pressure exists and continued operation of the automobile under these conditions could be severely damaging to the engine. Similarly, coolant temperature is monitored and compared to a predetermined threshold magnitude. When the coolant temperature exceeds the predetermined threshold, an alarm signal is provided to the operator of the automobile that continued operation under the overheated conditions could result in severe damage to the engine. These operating conditions are relatively straightforward and easily monitored. In both examples, the alarm signal represents a present situation that requires immediate attention. In other words, the overtemperature alarm does not indicate that a potential future overtemperature condition may occur but, instead, it indicates that the coolant temperature is presently greater than the predetermined temperature threshold. Similarly, the low pressure alarm does not predict a low pressure in the future but, instead, represents an existing condition in which the oil pressure is currently lower than required for proper operation of the engine.

Many techniques have been developed to monitor operating equipment and predict future failures that are not readily apparent and not easily detectable by basic monitoring techniques.

U.S. Pat. No. 5,633,456, which issued to Stander on May 27, 1997, describes an engine misfire detection system with digital filtering. The apparatus and method provide for detecting cylinder misfires in an internal combustion engine of a motor vehicle by digitally filtering out noise related signals to improve the signal to noise ratio. Crankshaft rotation is sensed and crankshaft velocities are measured for each cylinder. Changes in angular velocity are determined and correspond to each of a plurality of cylinder firing events. A window of consecutive changes in angular velocity are used with a digital filter. The digital filter contains filter coefficients which are determined from a frequency analysis for a given engine by distinguishing between actual misfire events and noise related event frequencies. From the analysis, a cut off frequency between actual misfires and noise is determined which is then used to determine the filter coefficients. The digital filter generates a filter output for the current cylinder firing event and the filter output is preferably multiplied by a gain to provide to provide a compensated filter output. The compensated filter output is compared to a threshold value and a misfire event is determined for the selected cylinder based on the comparison. A high pass filter may be employed to filter out low frequency noise related signals such as those associated with a power train bobble. Similarly, a low pass filter can be used to filter out high frequency noise signals such as those associated with crankshaft torsional vibrations. Both high and low pass filters could be employed in the alternative by using a high pass filter at low engine speeds and a low pass at high engine speeds.

U.S. Pat. No. 5,745,382, which issued to Vilim et al on Apr. 28, 1998, describes a neural network based system for equipment surveillance. The method and system is provided for performing surveillance of transient signals of an industrial device to ascertain the operating state. The method and system involves the steps of reading into a memory training data and determining neural network weighting values until achieving target outputs close to the neural network output. If the targets outputs are inadequate, wavelet parameters are determined to yield neural network outputs close to the desired set of target outputs and then providing signals characteristic of an industrial process and comparing the neural network output to the industrial process signals to evaluate the operating state of the industrial process.

U.S. Pat. No. 5,852,793, which issued to Board et al on Dec. 22, 1998, describes a method and apparatus for predictive diagnosis of moving machine parts. It is intended for automatically predicting machine failure and comprises a transducer sensor, such as piezoelectric crystal, and is applied to a machine for sensing machine motion and structure-borne sound, including vibration friction, and shock waves. The structure-borne sound and motion sensed is converted to electrical signals which are filtered to leave only the friction and shock waves, which waves are processed, as by detecting the envelope and integrating beneath the envelope, resulting in a measure of friction and shock wave energy. This measure is computed and processed for producing fault progression displays for periodic and aperiodic damage. This is accomplished in a personal computer, menu-driven environment.

U.S. Pat. No. 5,646,340, which issued to Gee et al on Jul. 8, 1997, describes an analytical tachometer. The method and apparatus for engine and rotary machine analysis provides a vibration sensor adapted to produce a plurality of superimposed waveforms corresponding to engine or machine operating parameters including rotational speed. The signals are transmitted by an RF transmitter/receiver system in analog modulated form to a data capture and analytical function unit utilizing a software sub-system in which a power spectral density plot is produced containing a signature characteristic of the engine or other machine under test. This signature is recognized by a signature detect algorithm which can recognize and trace the signature across the frequency spectrum covered by the apparatus so as to provide a continuous tachometric function not requiring the filtering out or other removal of irrelevant data. A diagnostic function arises from detection of the presence of additional harmonic peaks within the signature. A capacitive coupling offers a simplified tachometric function based upon low voltage signals in the injector leads of a spark ignition engine.

The patents described above are hereby explicitly incorporated by reference in the present application.

In the second edition of "RANDOM DATA, ANALYSIS AND MEASUREMENT PROCEDURES" by Bendat and Piersol, published by John Wiley & Sons, paragraph 6.1.2 describes ordinary coherence functions in relation to power spectral densities. In addition, it describes an example of an application of a power spectral density with regard to an airplane flying through atmospheric turbulence. The application of power spectral density profiles and the integrals thereof are generally known to those skilled in the art. Coherence functions can be used to distinguish between a reference power spectral density profile and a current power spectral density profile to determine whether or not the differences between the two are normal variations or, alternatively, represent an actual difference between the two profiles.

In certain mechanical apparatus, it would be significantly beneficial if a means could be provided that would allow the prognostication of faults before the faults become catastrophic or disabling. This is especially true in marine propulsion systems. If a system could be provided that predicted failure of mechanical or electrical components before those failures actually occurred, the problem components could be repaired or replaced and the failure of the components would not result in the marine vessel operator being stranded and unable to return to port. If an automobile engine fails, the driver is usually able to obtain alternative means of transportation that would allow the operator to return home safely and repair the automobile at some future time. In marine propulsion system applications, it is often the case that the marine vessel can be far from either the nearest convenient port or other vessels when an engine failure or other mechanical failure occurs. If the failure occurs when the marine vessel is far from land, alternative means for the operator to return to port may not be readily available. It would therefore be significantly beneficial if failures could be predicted sufficiently before their actual occurrences to allow the marine vessel operator to correct the problem before it occurs.

SUMMARY OF THE INVENTION

One embodiment of the present invention provides a method for prognosticating a potential failure condition of an apparatus which comprises the steps of determining a reference magnitude of an indicator parameter under a first set of preselected conditions and storing the reference magnitude of the indicator parameter for later use. The indicator parameter can be, but is not limited to, a g-force value provided as an output from an accelerometer attached to a gearcase of a marine propulsion unit or another location of a marine propulsion system, a pressure value provided by a pressure sensor connected to the oil system, fuel system, or air delivery system of an engine, or signals received by an ignition system of an engine. The reference magnitude of the indicator parameter can be developed by monitoring the indicator parameter for a preselected period of time and obtaining an operating mean value that is used as the reference magnitude. The first set of preselected conditions can include engine speed, measured in revolutions per minute (RPM). Additionally, it can also include a engine torque, measured in foot pounds. The reference magnitude can be stored in the memory of a micro-processor.

In a particularly preferred embodiment of the present invention, the first set of preselected conditions includes both engine speed (RPM) and engine load and these two operating characteristics are divided into a plurality of magnitude ranges. For each magnitude range of both the engine speed and the engine load, a unique reference magnitude is stored for the indicator parameter.

In a particularly preferred embodiment of the present invention, the reference magnitude is a power spectral density (PSD) profile, as a function of frequency, that is completely or partially stored as the reference magnitude.

The present invention further comprises the step of measuring the current magnitude of the indicator parameter under the first set of preselected conditions.

The current magnitude is measured subsequent to the reference magnitude being determined. In other words, after the reference magnitude of the indicator parameter is stored as a function of the engine speed and engine load, for example, it is compared to a current reading of the same indicator parameter. The current magnitude is then compared to the reference magnitude. By comparing the reference and current magnitudes of the indicator parameter, such as the power spectral density (PSD) or the integral of the power spectral density, in part or totally, a change in the condition of the apparatus can be detected.

In a preferred embodiment of the present invention, the measuring, comparing, and detecting steps are repeated continually at a predetermined frequency so that the current condition or magnitude of the indicator parameter can be continually compared to the reference magnitude of the indicator parameter. This enables the operating condition of the apparatus to be continually monitored in a way that allows for prognostication of potential future failures.

A preferred embodiment of the present invention would typically determine the reference magnitudes of each of the plurality of indicator parameters under an associated first set of preselected conditions for each of the plurality of indicator parameters. In other words, the power spectral density (PSD) for an accelerometer output, a pressure transducer output, and a voltage output from an ignition system could all be monitored by the present invention. Each of these different indicator parameters would have a reference magnitude, or profile, stored as a function of one or more operating conditions. For example, they can be stored as power spectral densities or the integrals of power spectral densities related to the indicator parameters and stored as a function of either engine speed alone, engine speed in combination with engine load, or any other operating characteristics.

Another embodiment of the present invention provides a method for characterizing the operation of an apparatus. The method comprises the steps of monitoring the magnitude of a first operating condition and periodically measuring a first indicator parameter during a time when the apparatus is operating at the first magnitude of the first operating condition. This embodiment of the present invention also comprises the step of recording an accumulated duration of time that the apparatus has operated at a first magnitude of the first operating conditions. For example, if the first operating condition is engine speed, the present invention would record the accumulated duration of time at each of the plurality of ranges of engine speed. More specifically, the number of minutes that the apparatus operates at an engine speed between 3000 RPM and 3500 RPM could be accumulated and each range of 500 RPM from 0 RPM to a maximum magnitude would be maintained in this same manner. This recording of the accumulated duration of time at a plurality of ranges of the first operating conditions allows an operational profile to be maintained.

The present invention would then determine a reference magnitude of a first indicator parameter for subsequent use when the apparatus is operating at the first magnitude of the first operating condition. The reference magnitude is determined as a function of one or more measurements of the first indicator parameter. In other words, the present invention periodically measures the first indicator parameter and develops a reference magnitude as a function of those measurements. The reference magnitude is stored as a function of the engine speed range at which the measurements were taken. Naturally, it should be understood that the first operating condition of the apparatus does not have to be engine speed. It can also be engine load or engine speed and engine load in combination.

The present invention further comprises the step of comparing the accumulated duration of time at the first operating condition to a predetermined threshold magnitude. The predetermined threshold magnitude can be virtually any magnitude of time, such as 20 minutes, that allows the present invention to have a sufficient degree of confidence that the reference magnitude is reliable. The present invention further comprises the step of calculating a difference between the stored reference magnitude and a subsequent measurement of the first indicator parameter. This indicator parameter, as described above, can be a power spectral density (PSD) or the integral of a power spectral density relating to an accelerometer output, a pressure transducer output, a voltage output from an ignition system of the apparatus, or a voltage output from a fuel or air injector. The present invention also comprises the step of provided an output signal if the difference between the stored reference magnitude and the subsequent measurement of the first indicator parameter exceeds a preselected value. The provision of the output signal can also be conditional on the comparison of the accumulated duration of time at the first operating condition and a predetermined threshold magnitude. For example, if the apparatus is an engine operating at a particular engine speed under a particular load, but the apparatus had not operated under these two simultaneous conditions for a minimum time duration of at least 20 minutes, the output signal providing step can be ignored if the value is below a predetermined limit. If, however, the engine had been operated at the combination of engine speed and engine load for greater than the minimum time duration (i.e. 20 minutes), the output signal can be used as an alarm condition because the reference magnitude stored as a function as the current engine speed and engine load would represent an operating value in which sufficient confidence could be placed to determine that the apparatus is not operating properly.

In summary, the present invention provides a method for judging the acceptability of an indicator parameter by comparing a recent magnitude of the indicator parameter to a stored reference magnitude of the same indicator parameter. The indicator parameter is a power spectral density or the integral of a power spectral density relating to a preselected variable, such as an accelerometer output, a pressure transducer output, or a voltage signal. In certain instances, a particular frequency range of a power spectral density or the integral of a power spectral density is used if that particular range has been predetermined to be particularly indicative of a fault condition. The present invention also develops an accumulative duration of time of the apparatus at specific magnitudes of certain operating conditions and uses that profile relationship to determine whether or not a particular indicator parameter should be used as a reference magnitude for any particular combination of operating conditions, such as engine speed and engine load.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
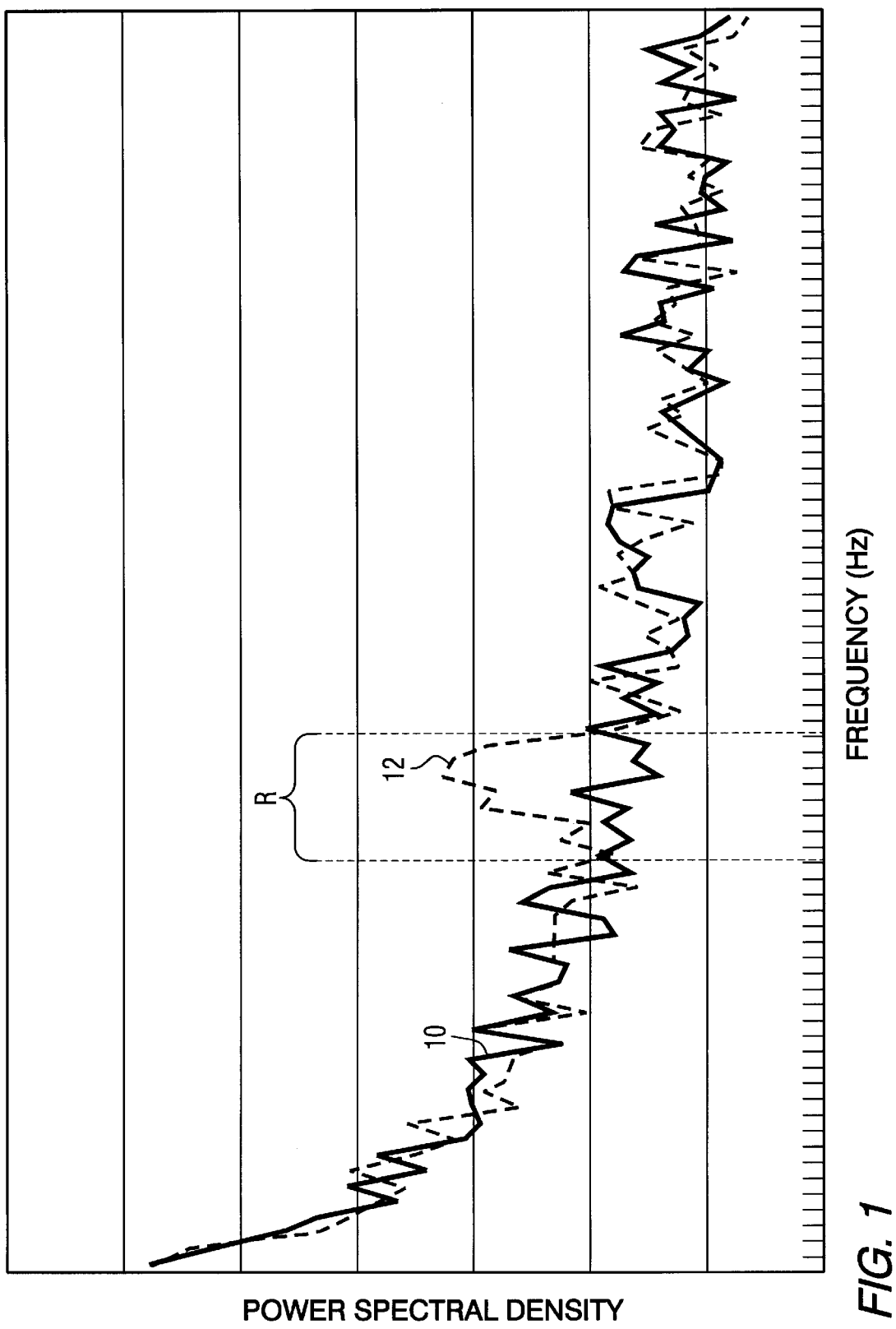
FIG. 1 is a hypothetical graphical representation of a reference profile and a subsequently taken profile for an indicator parameter.

Throughout the description of the preferred embodiment of the present invention, like components will be identified by like reference numerals.

In order to predict a future failure of components within an apparatus or system, the present invention monitors the power spectral density (PSD) of certain signals provided by certain sensors strategically placed throughout a marine propulsion system. It has been determined that the power spectral density can be used to identify subtle changes in the operation of certain components within a marine propulsion system.

FIG. 1 shows a hypothetical PSD profile 10 of the power spectral density (PSD) of a selected variable as a function of frequency. Although the profile 10 in FIG. 1 is hypothetical and provided only for the purpose of explaining the basic concepts of the present invention, it should be understood that the preselected variable selected as an indicator parameter can be the output from an accelerometer, the output from a pressure transducer, the reflected signal of a secondary winding voltage of an ignition coil back to the primary winding, or any other transducer output. By periodically measuring the power spectral density (PSD) of the selected indicator parameter, a reference profile, or magnitude, can be developed. The profile 10 represented by a solid line in FIG. 1 is a hypothetical reference magnitude for purposes of this description. It might be determined that a particular frequency range R of the PSD profile is particularly indicative of a certain type of mechanical or electrical failure. This type of behavior is determined through empirical and theoretical study of a particular system or apparatus. As an example, it may be determined that a change in the PSD within frequency R is a precursor of a gear tooth failure within a power transmission system. Once the precursor frequency range R is determined, a monitoring system continually measures the power spectral density and provides a profile of the power spectral density as a function of frequency, at least for the frequency range R. The reference profile 10 is then stored for later comparison to periodically update current magnitudes of the PSD. Dashed line 12 in FIG. 1 represents the most current PSD profile for the selected indicator parameter. As can be seen, a comparison of the reference magnitude profile 10 to the most current PSD profile 12, for the magnitudes within frequency range R, clearly indicate that a change has occurred. A microprocessor which is connected in signal communication with the appropriate equipment to receive the date represented graphically in FIG. 1 within determined the difference between the reference magnitude 10 and the most current PSD profile 12 within range R and compare the magnitude difference to a predetermined allowable differential. If the calculated difference exceeds the allowed differential, an alarm condition can be signal to the operator of the apparatus.

It should be understood that FIG. 1 illustrates a hypothetical reference magnitude profile 10 and a hypothetical most current PSD profile 12 for the purpose of describing the basic concept of the present invention and does not actually represent empirical data for any indicator parameter.

Figure 2:
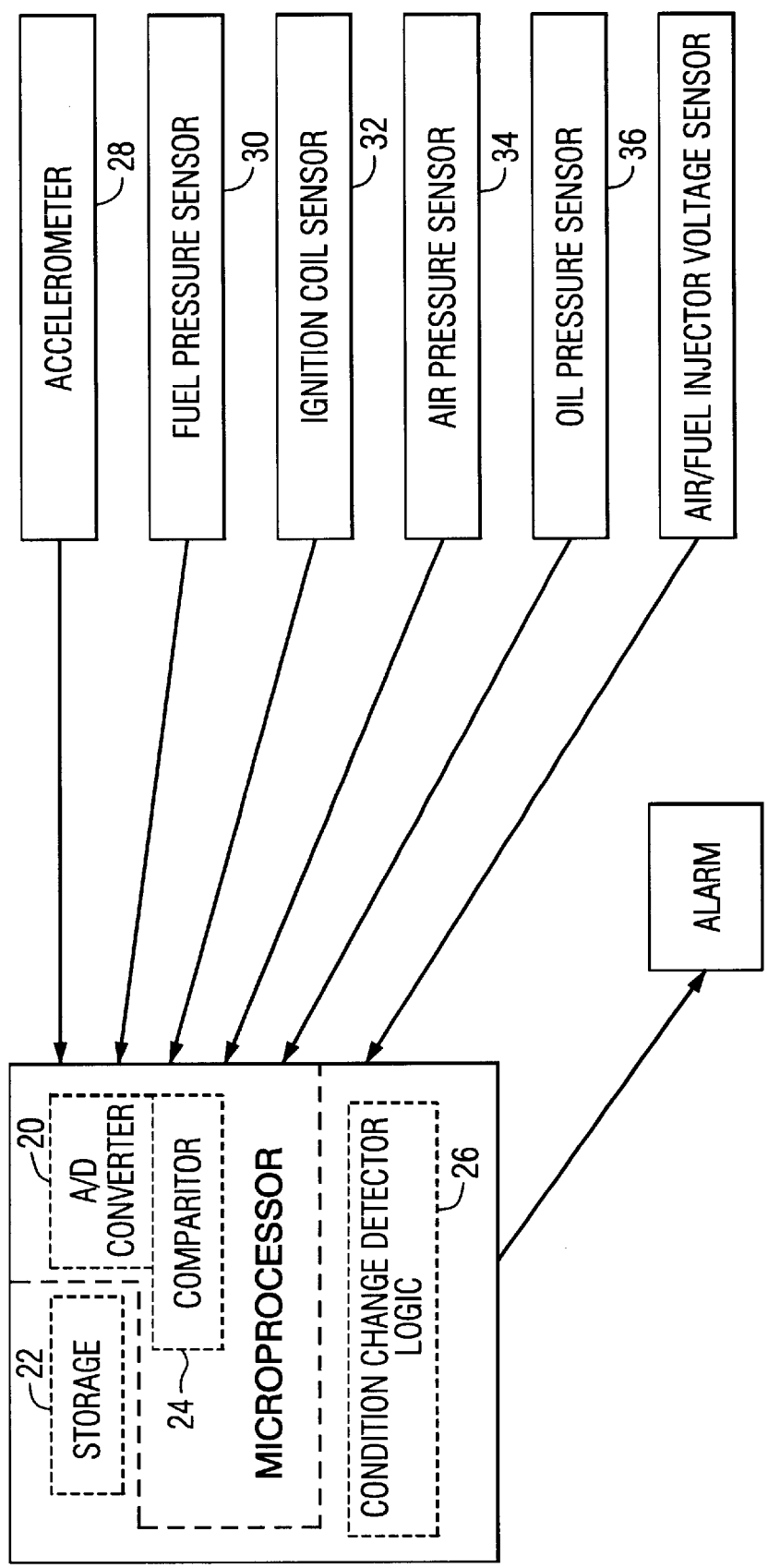
FIG. 2 is a simplified schematic of a system that can be used to perform the present invention.

FIG. 2 is a highly simplified schematic of a system used to implement the present invention. A micro-processor 20 is provided with memory storage 22, a means for comparing values 24, an analog to digital converter, and logic to provide a condition change detector 26 that responds to the mathematical determination of the comparitor 24 in comparing a most current magnitude of a power spectral density with a reference magnitude for the same indicator parameter. A system which incorporates the present invention can also comprise an accelerometer 28, a fuel pressure sensor 30, an ignition coil sensor 32, an air pressure sensor 34, and an oil pressure sensor 36. It should be understood that the systems can incorporate the present invention without all of the sensors shown in the right side of FIG. 2. Each of the sensors, 28, 30, 32, 34, and 36, would provide a signal to the micro-processor 20 that represents a magnitude of an indicator parameter. For example, the accelerometer can be attached to a gear housing in which two or more gears are connected in meshing relation with each other. In addition, the accelerometer could be used to detect the damaged marine propeller. The fuel pressure sensor could be connected to an engine's fuel system to detect potential problems with fuel injectors. The ignition coil sensor 32 could be connected in signal communication with an ignition coil to monitor the PSD of a voltage signal emanating from the ignition system. The air pressure sensor 34 could be connected in signal communication with an air supply line and could be used to detect possible problems with an air injection portion of a fuel injector. An oil pressure sensor 36 could be connected in signal communication with an oil delivery system to detect problems with an oil pump or other components of the oil As delivery system. As will be described in greater detail below, any one or more of the sensors shown in FIG. 2 can be used to provide a signal for which the power spectral density can be developed and monitored for use as a prognosticator of potential future failures.

Below, numerous examples of PSD monitoring techniques will be described in conjunction with associated figures. It should be understood that the particular PSD used to monitor an indicator parameter will typically be different for each specific apparatus or system that is monitored. The selection of the indicator parameter in most cases is application dependent.

Figure 3:
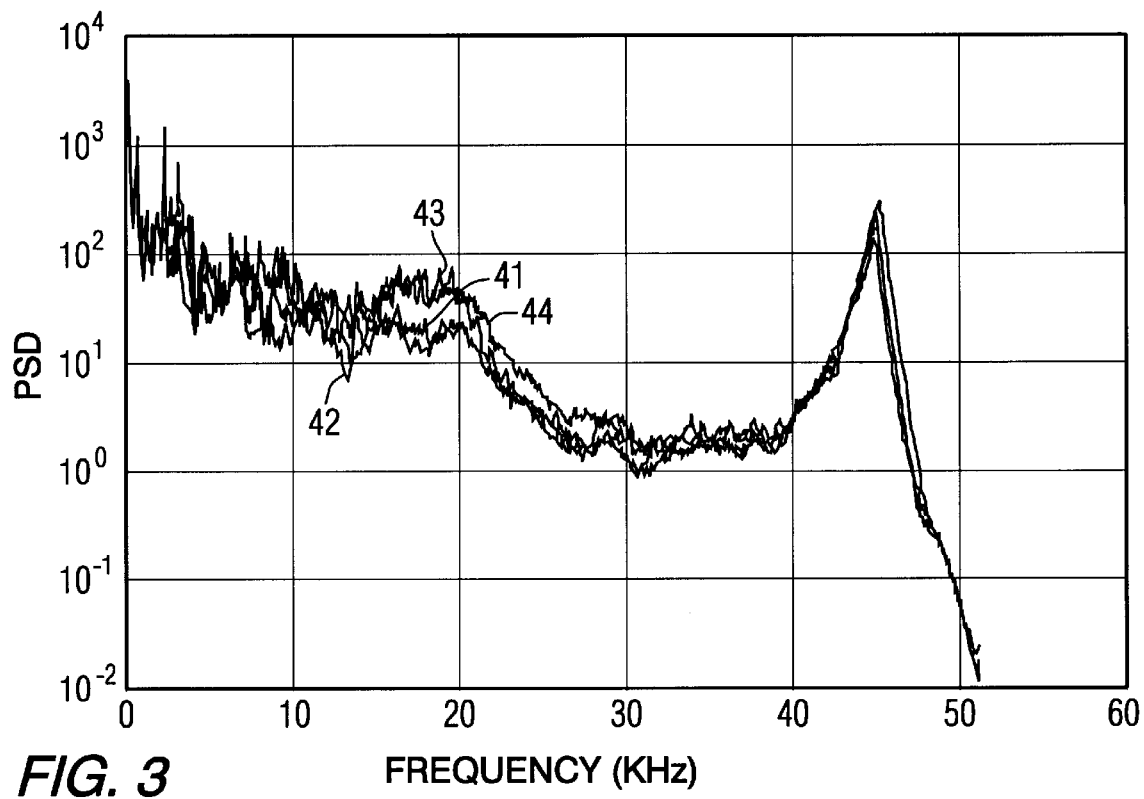
FIG. 3 shows four power spectral density profiles for two good gear sets, a spalled gear set, and a bad gear set.

FIG. 3 shows four PSD profiles associated with a gear case of a marine propulsion system. To measure vibration, an accelerometer was mounted on the gearcase, near the pinion and forward gears. The accelerometer was mounted to the gearcase to provide data which demonstrates the magnitude and frequency distribution changes between a good gear and pinion set in comparison with a spalled gear combination and a bad gear combination. The data represented by the profiles in FIG. 3 was provided by running the marine propulsion system with the good gear set, to provide a base line, and then installing and running the spalled gear set and, later, the bad gear set with a chipped tooth. Then, to verify the base line result of the operation with the good gear set, the good gear set was reinstalled and run again. The spalled gear set had been used for a significant period of time, and showed spalling, but did not show any actual damage such as a chipped tooth. The bad gear set actually had a chipped tooth. It should be noted, however, that even the chipped gear tooth set did not alter the operation of the marine propulsion systems sufficiently to be noticed by the operator. In FIG. 3, lines 41 and 42 represent the power spectral densities for runs with good gear sets. Line 43 represents the power spectral density for a spalled gear set and line 44 represents the power spectral density for a bad gear set with a chipped gear tooth. Several characteristics of the profiles, 41–44, in FIG. 3 can be noted. First, at frequencies from 0 to approximately 15 KHz, the profiles are essentially undistinguishable from each other. At frequencies above approximately 21 KHz, line 43 again becomes essentially undistinguishable from lines 41 and 42. Above a frequency of approximately 30 KHz, the four lines again become essentially undistinguishable from each other. However, in a frequency range of 15 KHz to 20 KHz, the spalled 43 and bad 44 gear profiles are clearly distinguishable from the two good profiles, 41 and 42. Therefore, if the PSD's shown in FIG. 3 are monitored by the present invention, using an indicator parameter which is the output of an accelerometer, spalled and bad gears can be identified by monitoring the frequency range between 15 KHz and 20

KHz. The profiles in FIG. 3 represent the power spectral density of the vibration, or g force, in the port-starboard direction at approximately 4,000 RPM. It should be noticed that additional energy in the range from 15 KHz to 20 KHz is evident for these spalled and bad gears. This indicates that there is notably more energy at these frequencies as a result of the reduced gear mesh caused by the spalling and chipped tooth.

Figure 4:
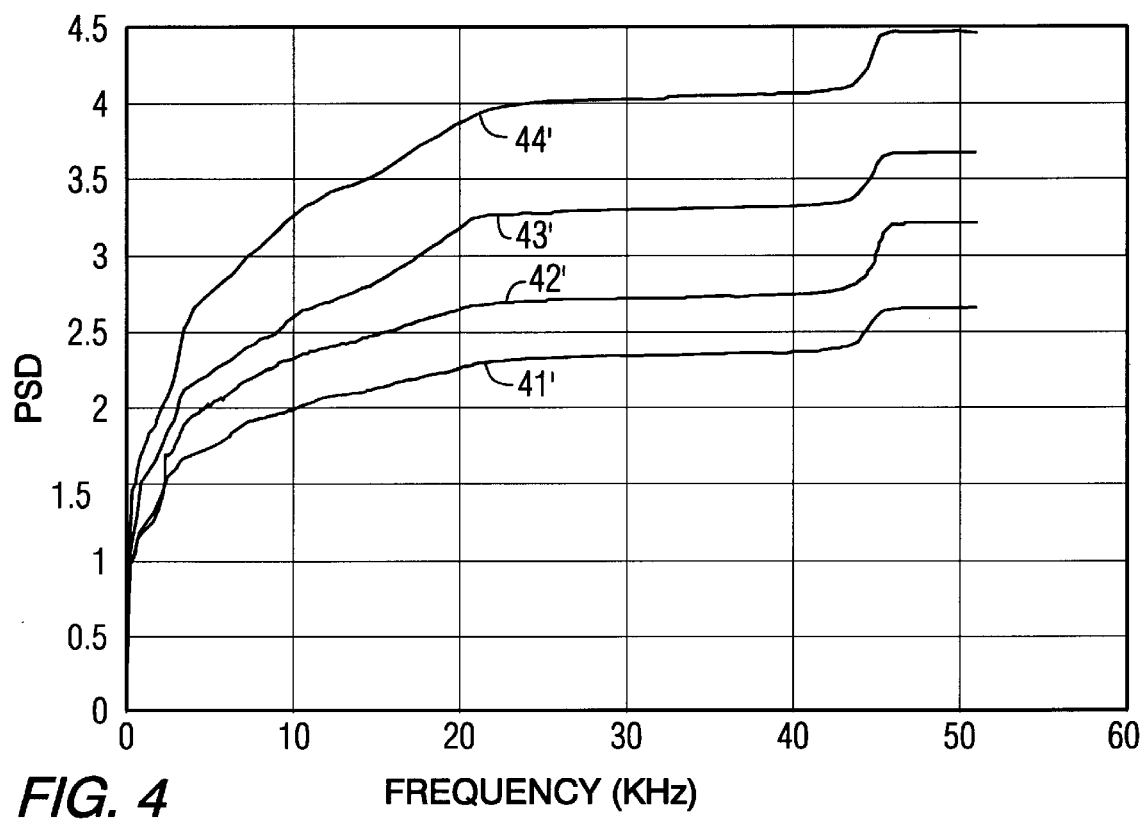
FIG. 4 shows an integral version of the profiles of FIG. 3.

The same data represented by the profiles in FIG. 3 can be integrated in order to more clearly identify differences between the profiles. The integrated PSD profiles are shown in FIG. 4. Profiles 41', 42', 43', and 44' in FIG. 4 represent the integrated versions of profiles 41, 42, 43, and 44 in FIG. 3. Even through profiles 41–44 in FIG. 3 were essentially indistinguishable between frequencies of 0 and 15 KHz, the integrated profiles in FIG. 4 can more easily be identified with respect to each other. Profiles 41' and 42' represent good gears, whereas profile 43' represents a spalled gear set and profile 44' represents a bad gear set with a chipped tooth.

In actual operation, the present invention would develop a reference profile, or magnitude, for an undamaged and unspalled gear set. That reference magnitude would be similar to profiles 41' and 42' in FIG. 4. In actual practice, the reference profile would be developed by averaging a preselected number of profiles taken with gear sets that are known to be undamaged and unspalled. That reference profile would then be used for later comparison to more recent profiles taken during the operation of the apparatus, such as a marine propulsion system. If a profile similar to 43' was monitored, the present invention could diagnose the marine propulsion system as having a spalled gear that requires attention in the near future. A profile similar to 44', however, would represent a damaged gear set, such as with a chipped tooth, and would necessitate immediate action by the operator. Both conditions, represented by profiles 43' and 44', would result in an alarm condition that would notify the operator of a potential future failure. Since the present invention is able to detect the difference between a spalled gear set 43' and a chipped tooth gear set 44', specific alarms could be tailored to more particularly inform the operator of the diagnosed malfunction.

Figure 5:
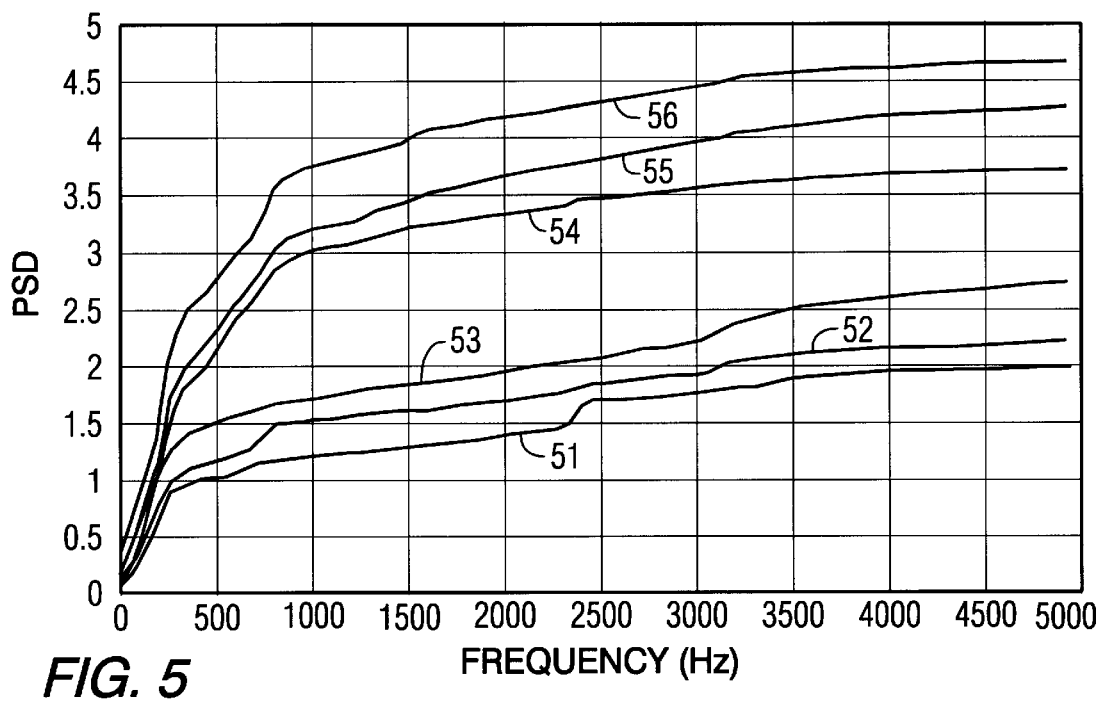
FIG. 5 shows six power spectral density profiles for various combinations of good gear sets, spalled gear sets, bad gear sets, undamaged propellers, and damaged propellers.

In a marine propulsion system, various different components can simultaneously exhibit precursors of potential future failures. For example, marine propellers can be damaged if they are caused to impact submerged obstacles, such as rocks or floating debris. A damaged propeller will induce vibrations in the gearcase of a marine propulsion system. It is necessary that a monitoring system be able to distinguish between signals received as a result of a spalled or bad gear set from signals received as a result from a damaged propeller. FIG. 5 represents six profiles of integrated power spectral densities. Profile 51 is the result of a good gear set combined with an undamaged propeller. Profile 52 is the result of a spalled gear set with a good propeller. Profile 53 is the result of a bad gear set with a good propeller. As can be seen, profiles 51, 52, and 53 differ by a slight, but measurable, magnitude that allows the present invention to distinguish a good gear set 51 from a spalled gear set 52 or a bad gear set 53 when the three conditions exist with an undamaged propeller.

With continued reference to FIG. 5, profile 54 represents a good gear set run with a damaged propeller, profile 55 represents a spalled gear set with a damaged propeller, and profile 56 represents a bad gear set with a bad propeller.

With continued reference to FIG. 5, it can be seen that the use of the PSD profiles by the present invention allows the detection of precursors of future failure even when combined precursors are present in the system. For example, the lower profiles, 51–53, demonstrate that spalled and bad gear sets can be identified and distinguished from each other when the propeller is undamaged. The upper three profiles, 54–56, show that even with a damaged propeller the spalled gear set and the bad gear set can be distinguished from a good gear set with an integrated PSD profile.

Figure 6:
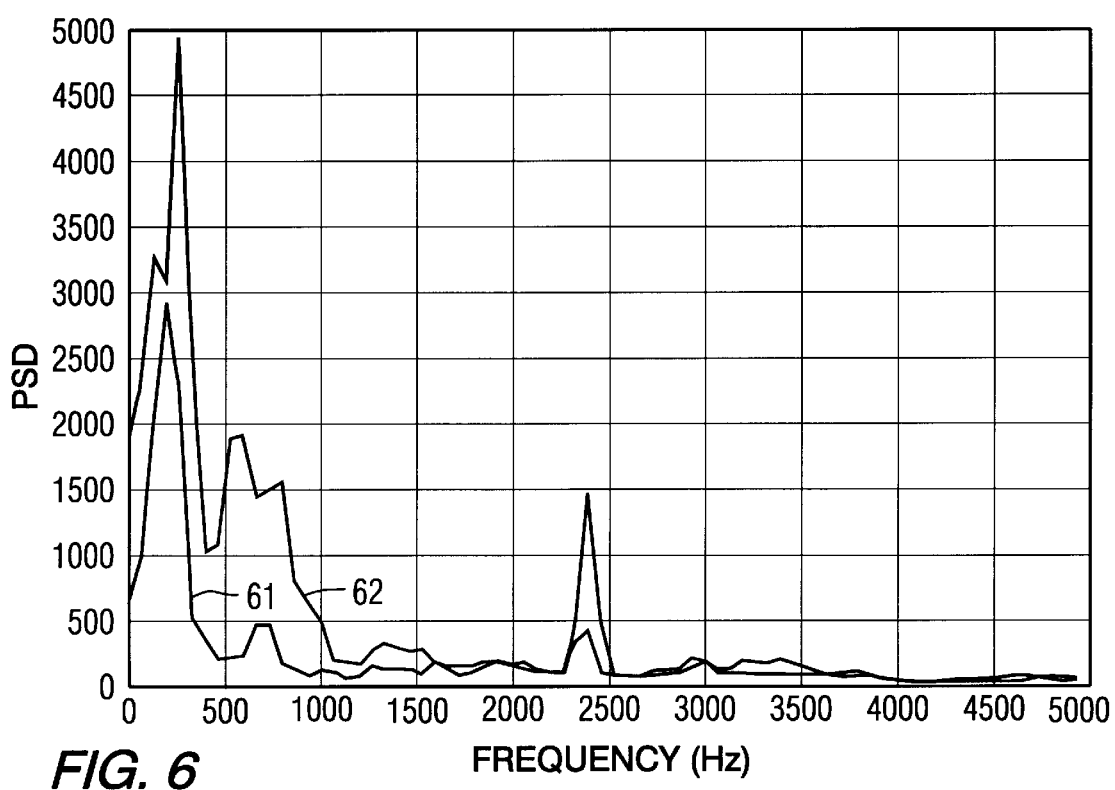
FIG. 6 shows power spectral densities for a damaged and an undamaged propeller.
Figure 7:
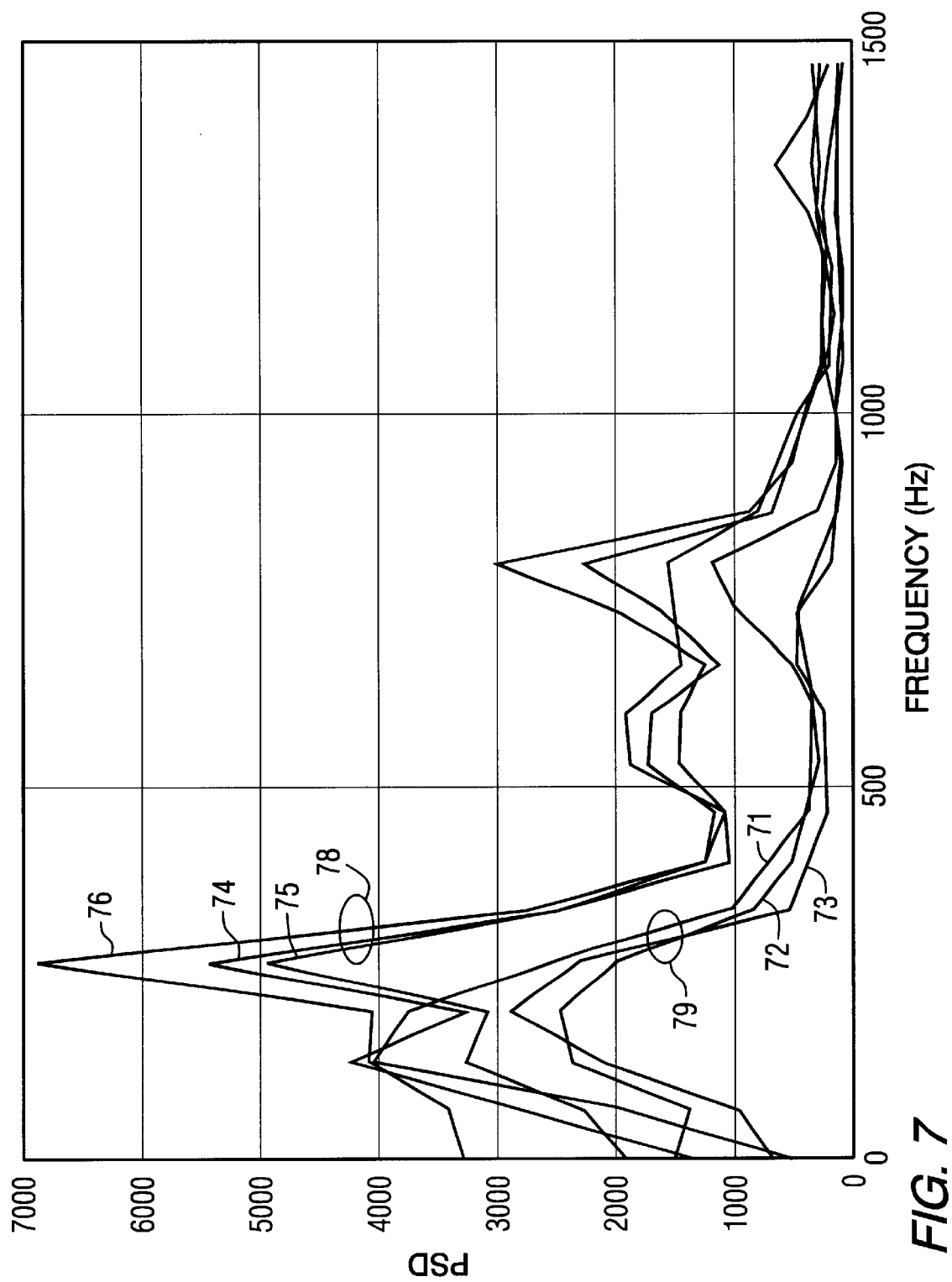
FIG. 7 shows six power spectral density profiles that represent various combinations of good gears, spalled gears, bad gears, undamaged propellers, and damaged propellers.

FIG. 6 shows the PSD profiles for an undamaged propeller 61 and a damaged propeller 62, both propellers being associated with good gear sets. At frequencies between 0 and 1 KHz, the damaged propeller 62 has significantly higher energy and can easily be detected by the method of the present invention. The profiles shown in FIG. 5 and described above are integrated PSD profiles. FIG. 7 shows the power spectral density profiles for the same combinations of damaged and undamaged propellers combined with good gear sets, spalled gear sets, and bad gear sets. However, the profiles shown in FIG. 7 are not integrated. Profile 71 is a bad gear set with an undamaged propeller, profile 72 is a spalled gear set with an undamaged propeller, and profile 73 is a good gear set with an undamaged propeller. Also shown in FIG. 7 are the profiles for a bad gear set with a damaged propeller 74, a good gear set with a damaged propeller 75, and a spalled gear set with a damaged propeller 76. The grouping identified by oval 78 all involve a damaged propeller, whereas the grouping identified by oval 79 all have undamaged propellers.

The power spectral density profiles described above relate to information obtained from an accelerometer. It should be understood that the power spectral density profiles can comprise other types of data representing various indicators parameters. For example, ignition system feedback has been researched in the automotive industry for several decades. Much of this research utilizes micro-processors, included in automotive control systems, that are used in diagnostic applications relating to misfire detection and diagnostics. Relative engine load, air/fuel mixture abnormalities, and misfire detection can all be determined by ignition power spectral densities.

Figure 8:
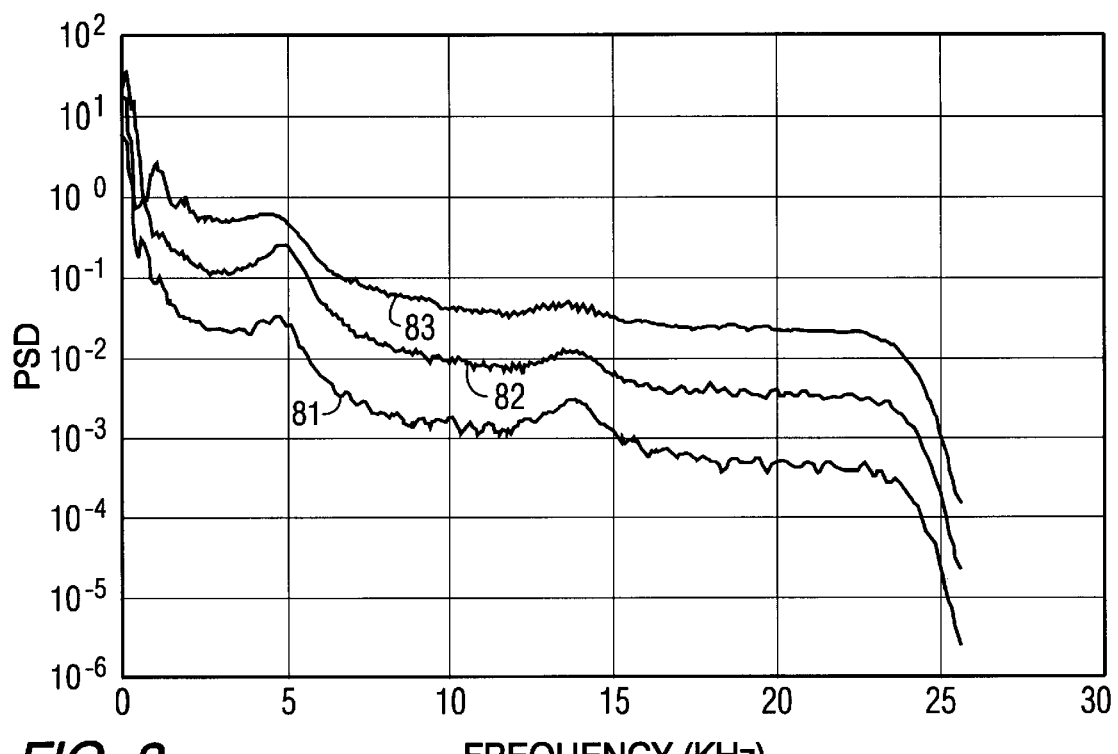
FIG. 8 shows the power spectral density profiles for an ignition system at idle, an ignition at 1800 RPM, and an ignition system at 4000 RPM.
Figure 9:
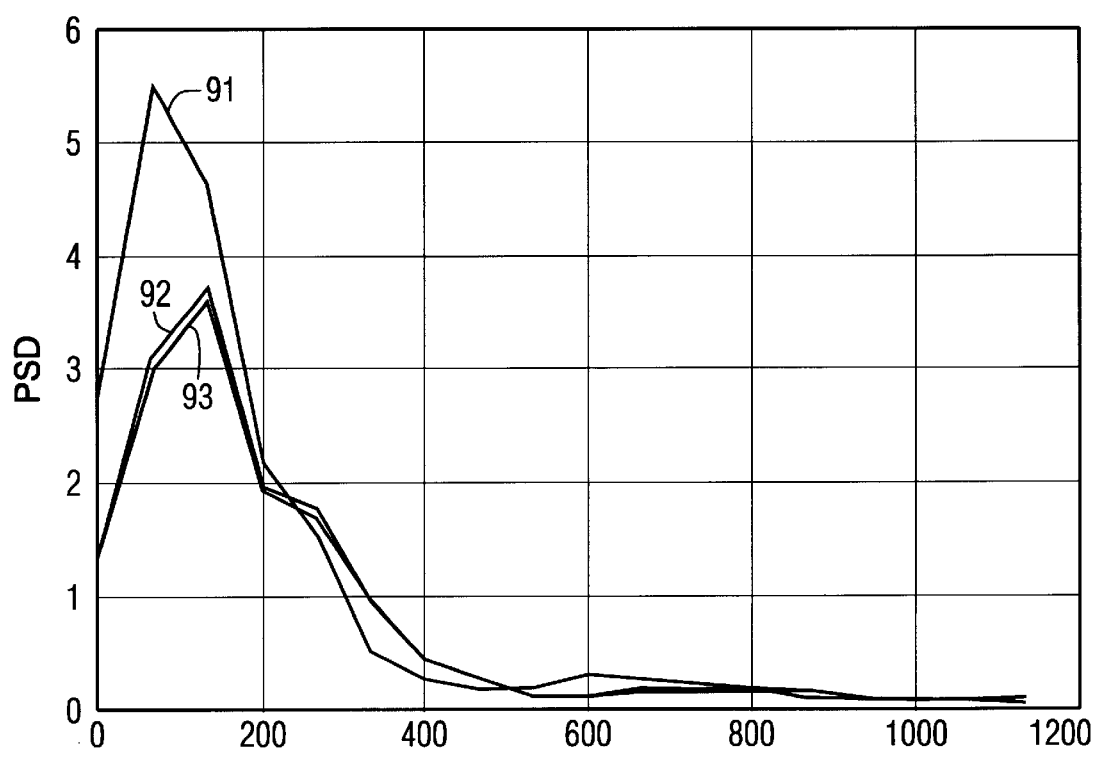
FIG. 9 shows three power spectral density profiles for ignition traces which are normal, having a fouled plug, and having a worn plug.

FIG. 8 shows three PSD profiles relating to a normally operating ignition system. Profile 81 represents an engine running at idle speed, profile 82 represents an engine running at 1800 RPM, and profile 83 represents an engine running at 4000 RPM. Fouled or worn spark plugs can cause an ignition system to run sub-optimally. The energy transferred to the spark gap of a spark plug is thereby reduced. In the case of fouled spark plugs, the ignition energy is shorted between the center and ground electrodes. Typically, the plug is not completely shorted and some spark does occur, but spark is typically tracking on the surface of the spark plug core and is not in a suitable location for a proper initiation of combustion. In the case of a worn spark plug, the gap has been increased substantially and the demand voltage is increased proportionally with the increased gaps. The ignition coil fires across this larger gap, but at a shorter duration due to the increase in required voltage. These scenarios can be observed at relatively low frequencies. For example, FIG. 9 shows three PSD profiles. In FIG. 9, the power spectral density profiles represent a normal spark plug 91, a worn spark plug 92, and a fouled spark plug 93. As can be seen in FIG. 9, the worn and fouled spark plugs, 92 and 93, can easily be distinguished from a normal spark plug 91 even at the relatively low frequency range of 0 to 200 KHz.

Figure 10:
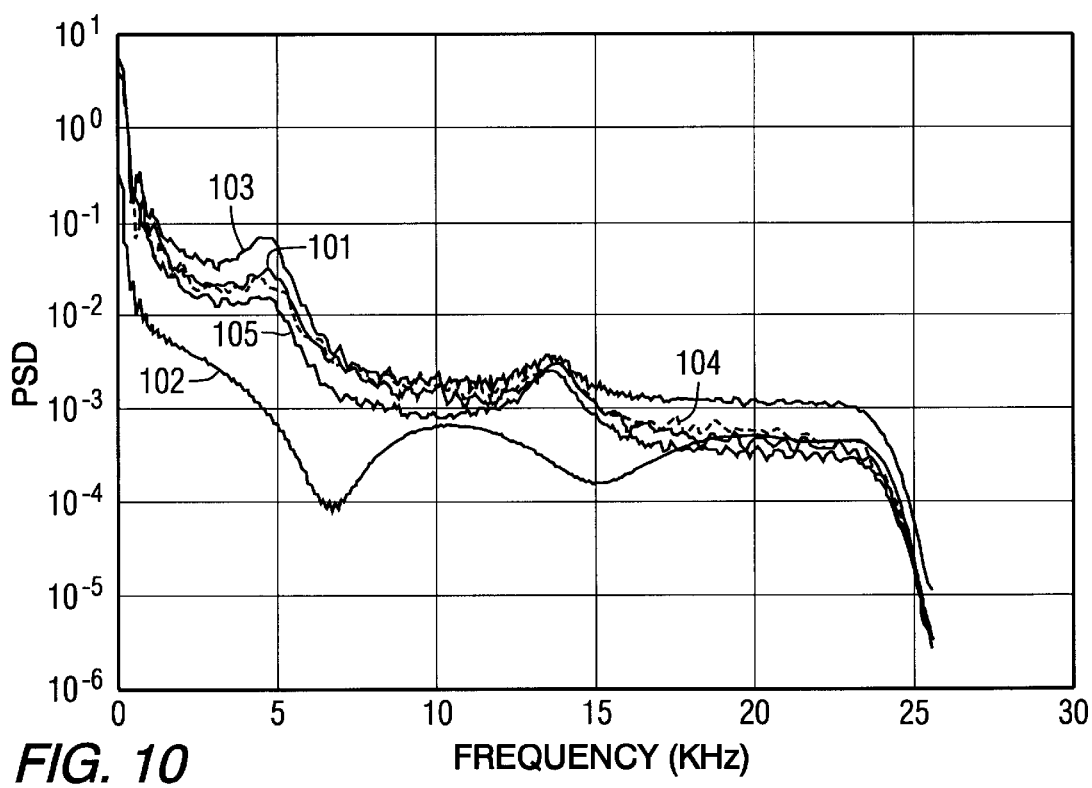
FIG. 10 shows power spectral density profiles for an ignition system that is normal, having a bad coil, having a struck air injector, having an overly lean fuel/air mixture, and having a degraded injector.
Figure 11:
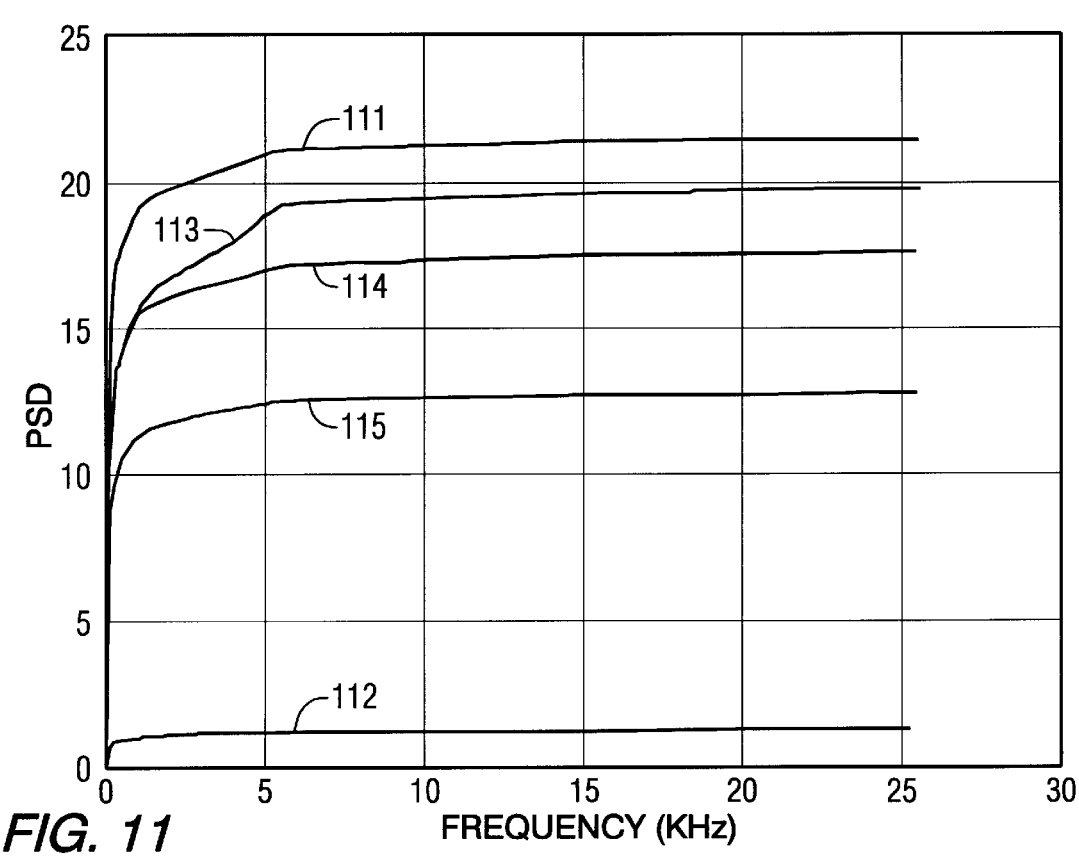
FIG. 11 shows integral power spectral density profiles of an ignition system that is normal, having a bad coil, having a struck air injector, having an overly lean fuel/air mixture, and having a degraded injector which was simulated by retarding the start of air parameter of the fuel injection system by 7 degrees.

Using secondary ignition energy, the present invention is also able to detect a failed ignition coil, a stuck injector, and a degraded injector. In FIG. 10, a normal secondary ignition power spectral density profile 101 is compared to various types of faults. A bad coil 102 is obviously distinguishable from the good coil 101. A stuck injector 103 shows a higher energy than the good coil 101 within the range of 0 to 5 KHz. Profile 105 represents a "start of air" parameter for a direct fuel injector that was intentionally retarded by 7 degrees to simulate a weak injector which does not have the proper electromechanical response time. Power spectral density profile 104 represents an overly lean mixture of fuel and air. In FIG. 10 the various profiles, except the bad coil 102, are relatively similar to each other and not easily distinguished from each other. However, if the profiles in FIG. 10 are integrated, they yield results shown in FIG. 11. The normal ignition profile 111 can easily be distinguished from the various fault conditions. For example, the stuck air injector 113 and the overly lean mixture 114 are measurably lower than the normal PSD profile 111. In addition, the simulated degraded injector, which is actually simulated by retarding the start of air parameter by 7 degrees, is represented by line 115. The bad coil 112 is the lowest power spectral density profile in FIG. 11. As can be seen, the integrated profiles in FIG. 11 are easily distinguishable from each other.

A fuel pressure transducer can also be used by the present invention to detect a stuck fuel injector. A struck fuel injector results in middle-to-high frequency disturbance in the fuel rail of a fuel injected engine. Because the pressure fluctuation frequency is generally related to engine speed, the energy seen in the pressure fluctuations at 4000 RPM is more than 10 times greater than that seen at idle.

Figure 12:
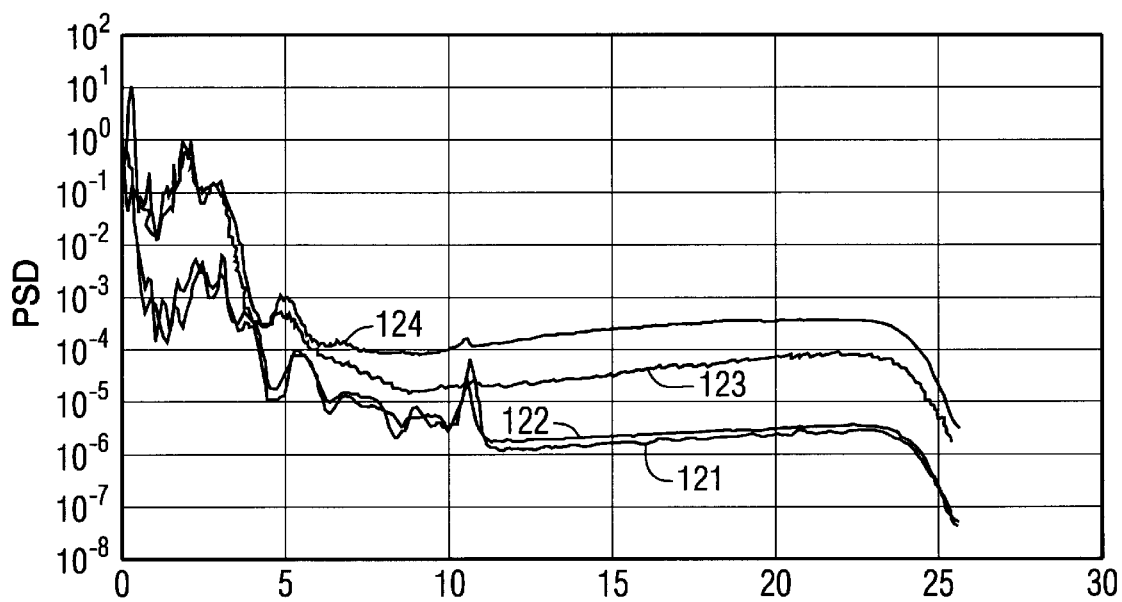
FIG. 12 shows four power spectral density profiles for fuel pressure measurements that indicate a normal injector at idle speed, a struck injector at idle speed, a normal injector at 4000 RPM, and a stuck injector at 4000 RPM.

In FIG. 12, the four power spectral density profiles represent a normal injector at idle 121, a stuck injector at idle 122, a normal injector at 4000 RPM 123, and a stuck injector at 4000 RPM 124. As can be seen, the two traces at idle are generally similar to each other as are the two traces at 4000 RPM. Although distinctions can be seen between a good injector and a stuck injector at both engine speeds, they are not as easily detected as they are when the profiles in FIG. 2 are integrated.

Figure 13:
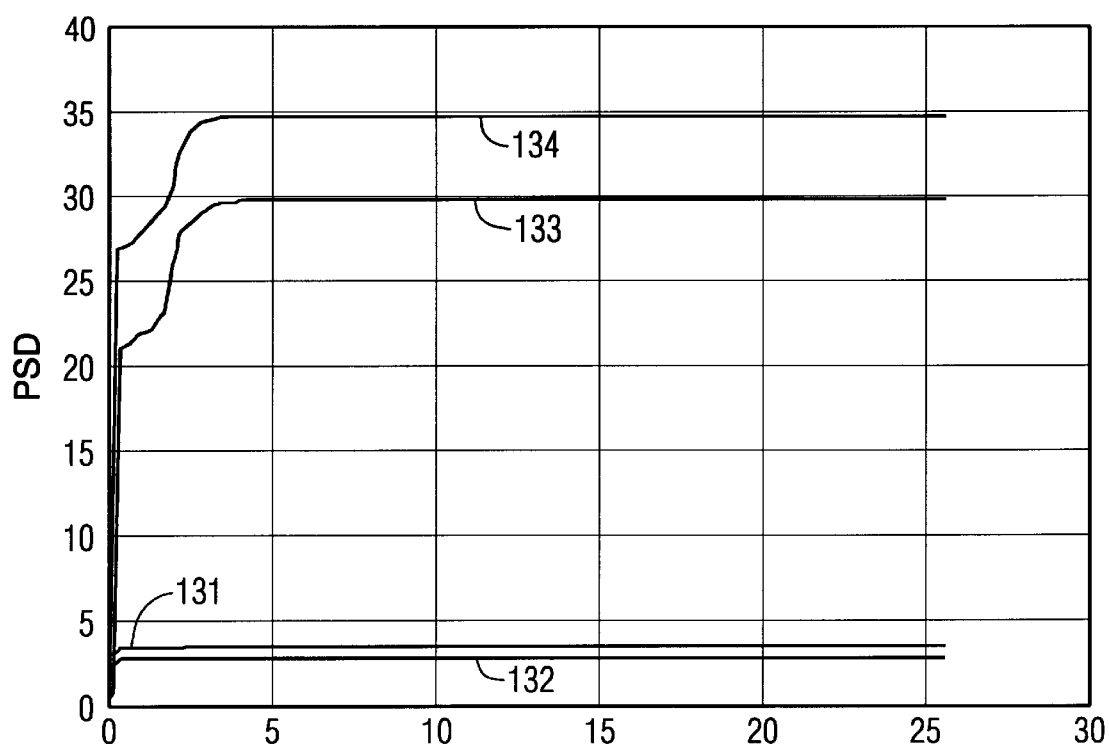
FIG. 13 shows the integral forms of the profiles in FIG. 12.

FIG. 13 represents the integral profiles of the power spectral densities represented in FIG. 12. The good injector at idle speed (reference numerals 121 and 131) and the stuck injector at idle speed (reference numerals 122 and 132) are generally similar to each other, even when integrated as represented in FIG. 13. However, the stuck injector 134 is easily discernible from the good injector 133.

Figure 14:
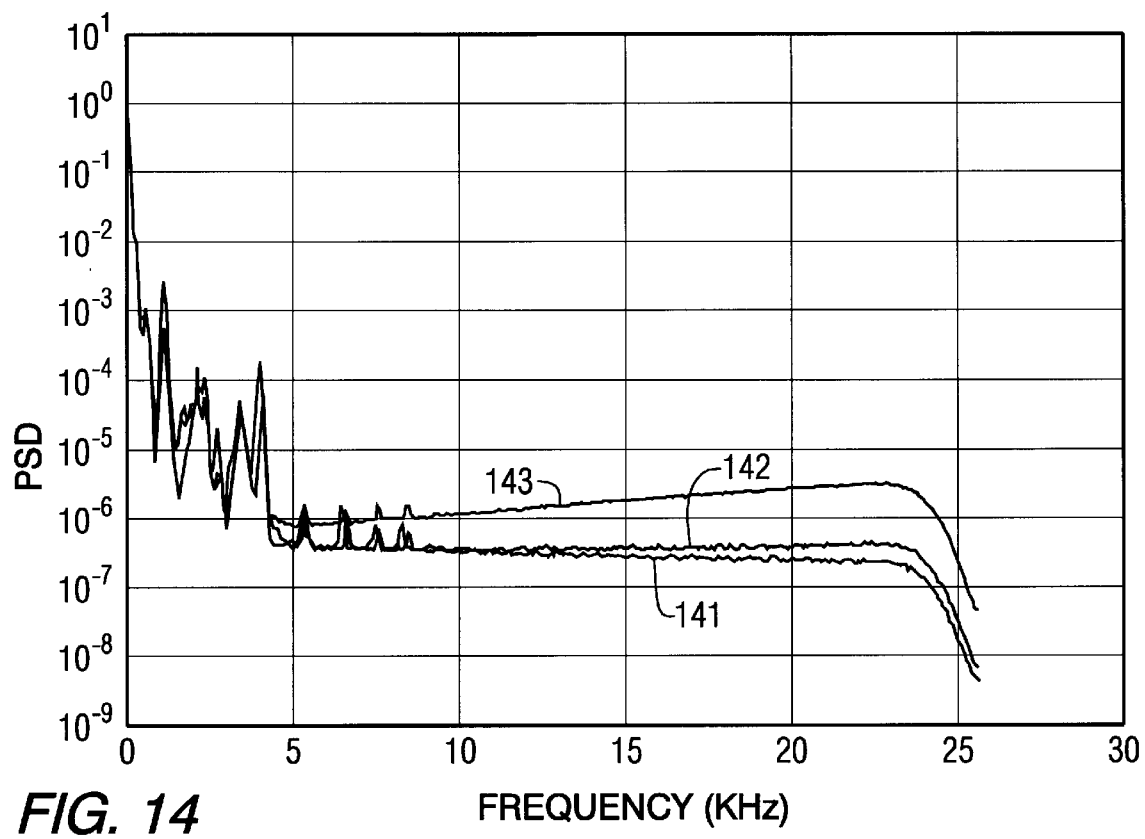
FIG. 14 shows power spectral densities for air pressure signals at a normal condition, with a struck air injector, and with a simulated degraded injector.
Figure 15:
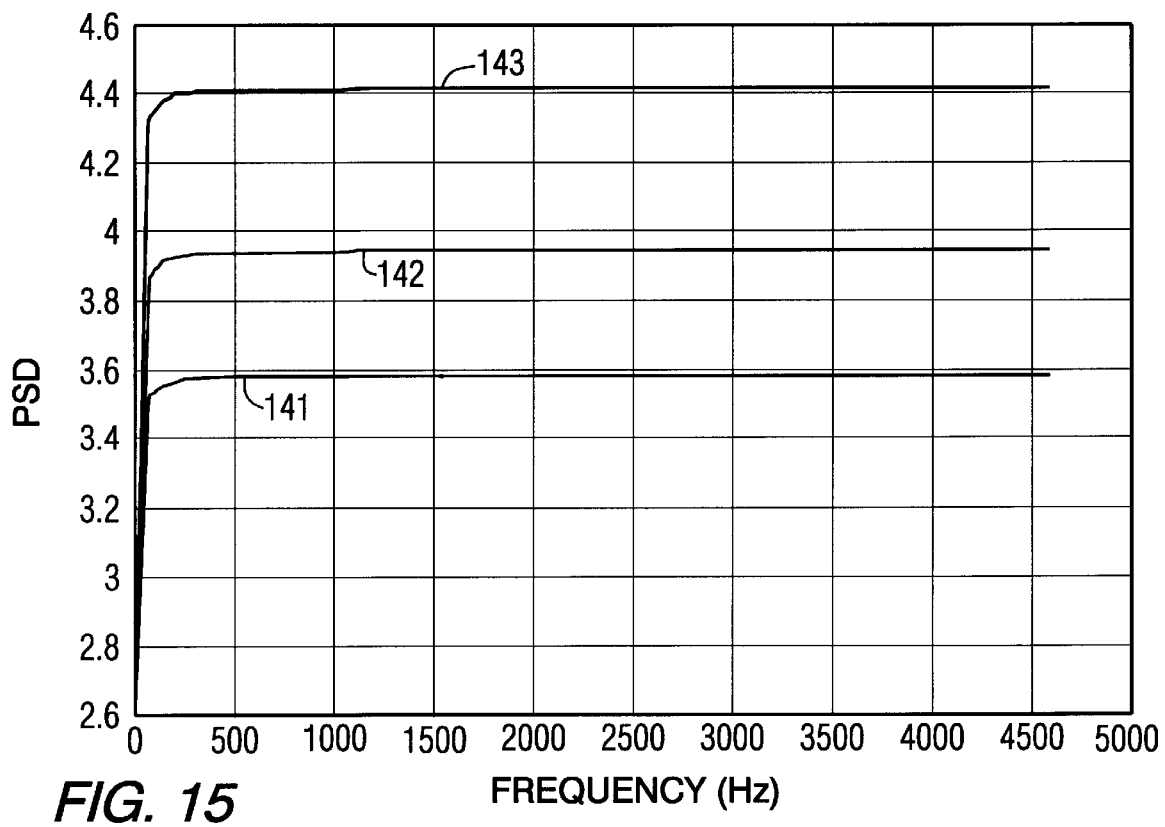
FIG. 15 shows the integral versions of the profiles of FIG. 14.

Air rail pressure can also be used by the present invention to sense a degraded or struck air injector. A degraded air injector has been simulated by retarding the start of air injector by 7 degrees, as described above. FIG. 14 represents the power spectral density of the air rail pressure signal when the engine is operating at idle speed. The normal air injector 141 and the degraded air injector 142 appear to be generally similar to each other in FIG. 14. A stuck air injector 143 can be distinguished from the other two in FIG. 14, but only at frequencies greater than 5 KHz. It becomes significantly easier to distinguish these three profiles from each other if the power spectral densities are integrated, as represented in FIG. 15. The struck air injector 143 can easily be distinguished from both the normal air injector 141 and the degraded air injector 142 when the power spectral densities are integrated. If the reference value for this particular indicator parameter is profile 141, the present invention can both detect and identify the degraded air injector 142 and the struck air injector 143.

Figure 16:
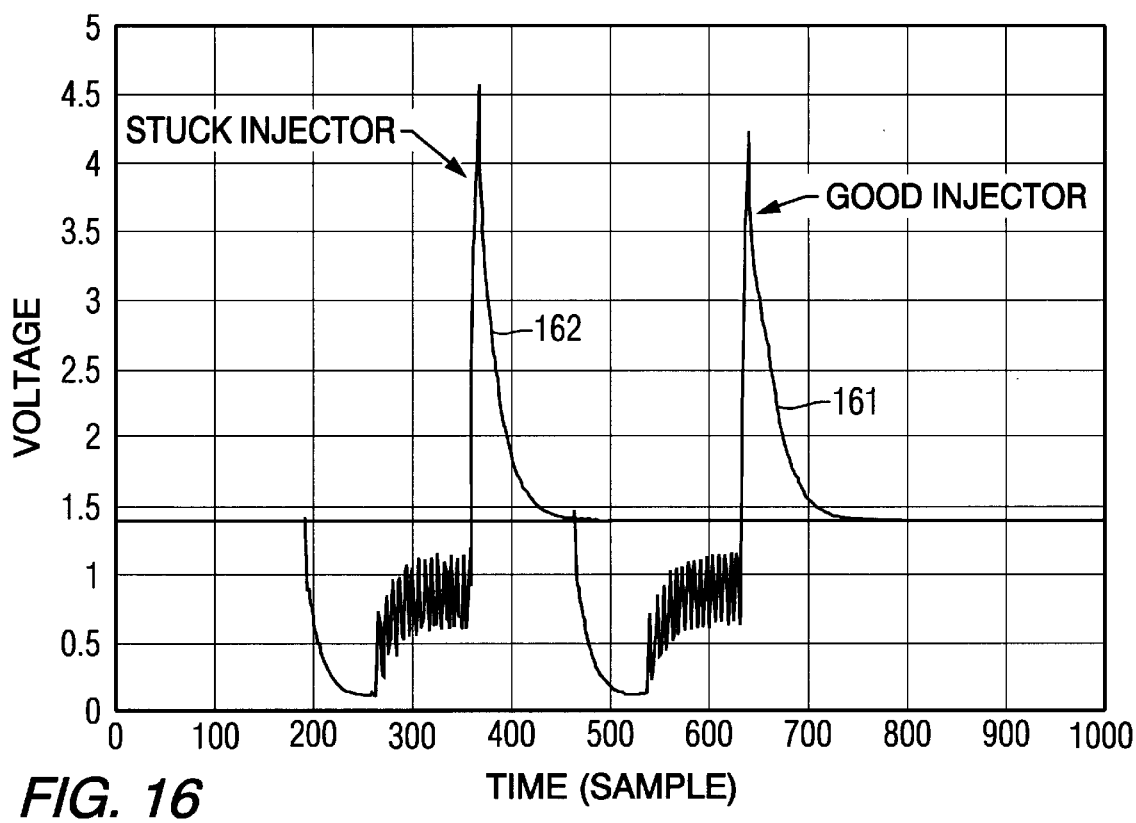
FIG. 16 shows a time based representation of an air injector voltage.

Air injector voltage can also be monitored for the purpose of distinguishing a properly operating air injector from one that is struck. FIGS. 16 shows two voltage traces that comprise 1000 samples taken over a period of approximately ten milliseconds. The good injector is represented by trace 161 and the stuck injector is represented by trace 162. The time domain trace shown in FIG. 16 represents the air injection voltage as it is initially fired and limited to three amperes and then held between 1 and 2 amperes for the duration of the injection process. The current limiting is achieved by a monostable chopper, resulting in the chop near the bottom of the voltage waveforms. It should be noticed that the increased amplitude of the fly-back voltage is evident in the struck injector 162. The increased voltage may be an effect of the reluctance at the initial condition, whereas the reluctance decreases in the case of the properly operating injector 161.

Figure 17:
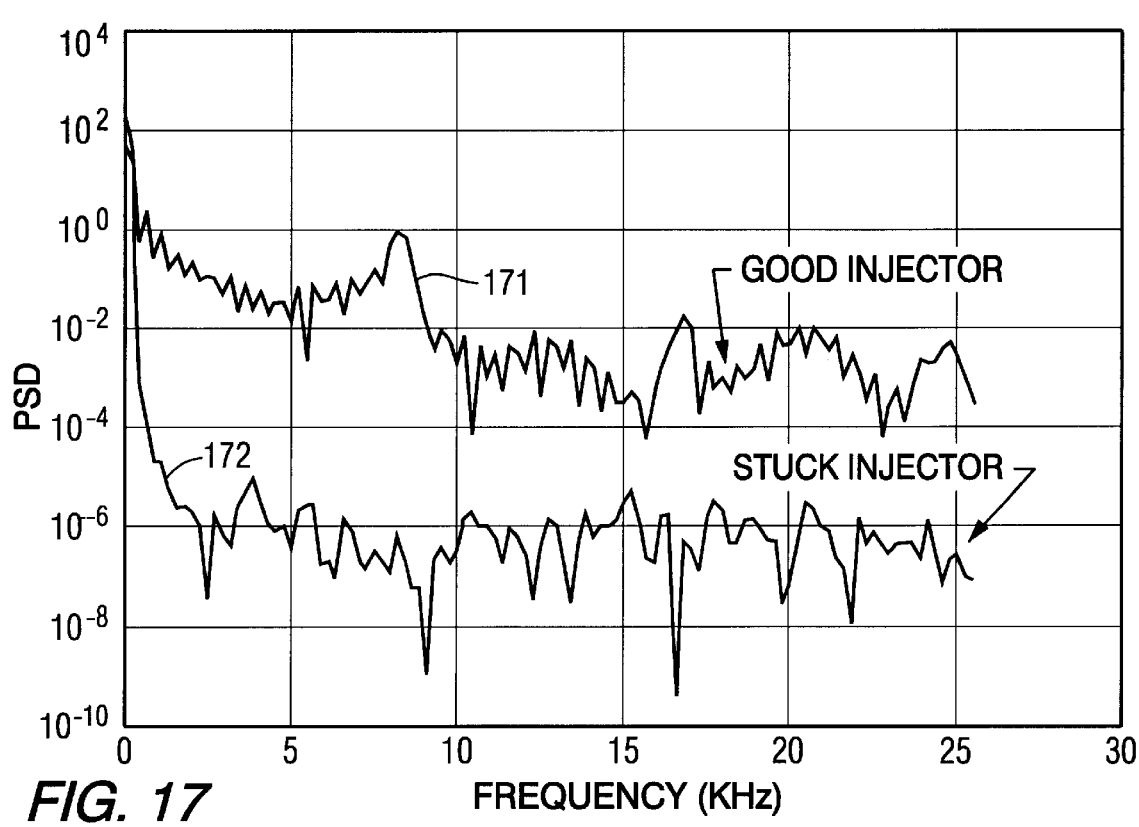
FIG. 17 shows a power spectral density of an air injector voltage for a good injector and a stuck injector.

With reference to FIG. 17, the power spectral density for the good injector 171 allows the present invention to recognize the existence of a struck injector 172. Even at relative low frequencies below 5 KHz, the difference is detectable. Therefore, the power spectral density of the air injector voltage allows the present invention to use this indicator parameter as a precursor of a potential future failure.

Figure 18:
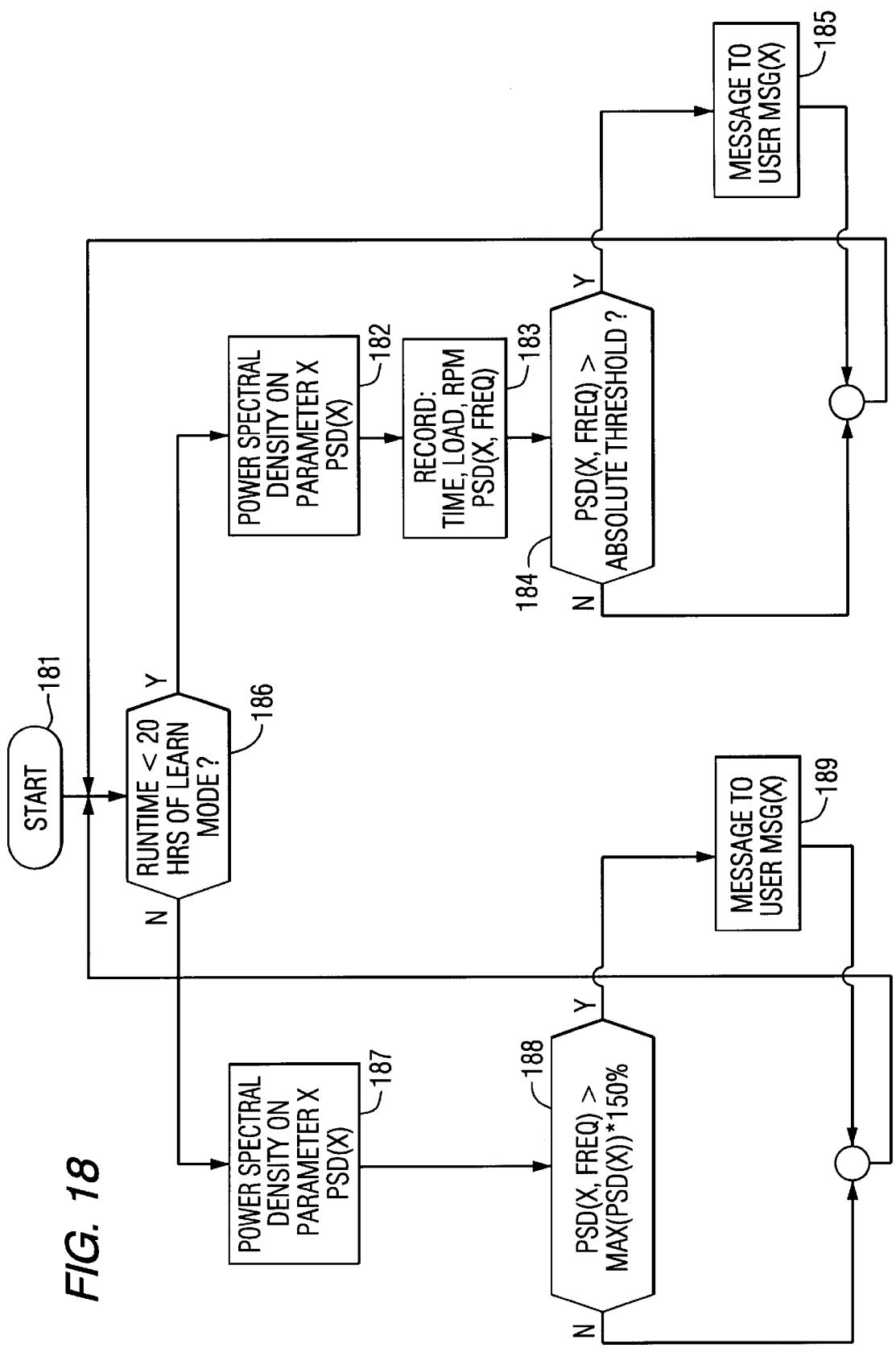
FIG. 18 is a flow chart used to perform the method of a preferred embodiment of the present invention.

FIG. 18 shows a representative flow chart that can be followed to perform the steps of the present invention. From the start block 181, the micro-processor first determines if the run time at the preselected operating conditions has exceeded 20 hours of learn mode. It should be understood that the 20 hour period is hypothetical for purposes of the description and is not limiting to the present invention. What this means is that the first 20 hours of operation at any particular set of operating conditions, such as might be defined by the operating speed of the engine and the load on the engine, is used to calculate a reference magnitude that will later be used as a template against which subsequent magnitudes of the indicator parameter will be compared. As will be described in greater detail below, the present invention also uses a method for characterizing the operation of an apparatus, such as a marine propulsion system, and that method incorporates steps that develop a profile of usage of the apparatus as a function of 1 or more operating conditions. If the system is still in the learning mode for the present set of operating conditions under which the apparatus is operating, the power spectral density is observed, at functional block 182, and it is recorded as a function of engine speed and load. This is represented by functional block 183 which records the time at the load and RPM. Until a reference magnitude of the power spectral density can be calculated for 20 hours running time, an absolute threshold is used. This comparison of the current power spectral density and the absolute threshold is made at functional block 184. If the PSD exceeds the absolute threshold, a message is provided to the user at functional block 185.

With continued reference to FIG. 18, if the system has operated for more than 20 hours at the particular combination of operating conditions, as determined by functional block 186, the power spectral density is again taken at functional block 187 and compared to a reference magnitude of the power spectral density as determined by a particular relationship defined at functional block 188. If it exceeds the threshold, a message is provided at functional block 189 to notify the operator.

With continued reference to FIG. 18, it can be seen that the power spectral density for a selected indicator parameter, such as an accelerator output signal, is periodically measured. During the first 20 hours of operation at any particular set of operating conditions, the periodic measurements are used to determine a reference magnitude that will be used in comparison to subsequent power spectral densities for the indicator parameter. During that initial 20 hour period of time, preset absolute thresholds will be used to determine an improper operation of the indicator parameter. After a reference magnitude, or profile, is calculated for the indicator parameter, the reference magnitude is used for these comparisons.

Although functional block 188 shows that the power spectral density is compared to a value that is 50% greater than the maximum power spectral density recorded by block 183, it should be understood that this is only one of many comparison algorithms that can be used. These values can be calibrated, depending on the sensing distribution.

Figure 19:
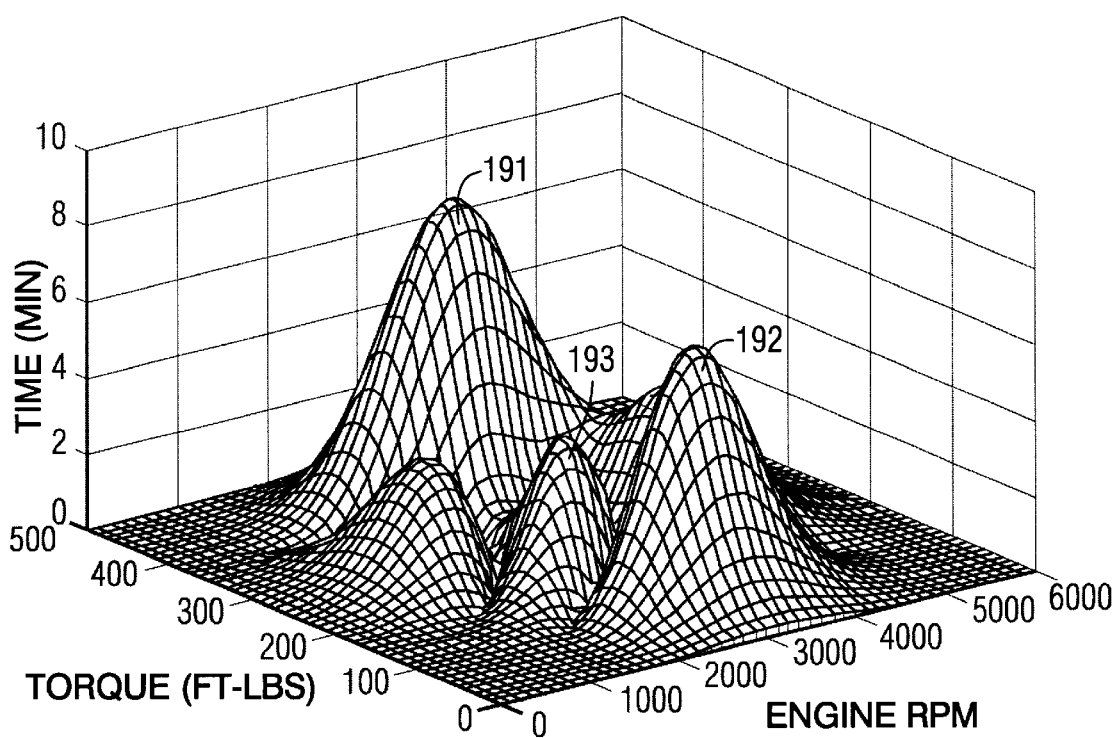
FIG. 19 shows a time duration profile as a function of two particular engine operating characteristics.

Throughout the description of the preferred embodiment, reference has been made to the development of a usage profile for the apparatus as a function of one or more operating conditions. It has been found that engine speed and engine load are two particularly useful operating conditions that can be used for a basis for the recordation and comparisons described above. It has also been determined that comparison of the most currently read power spectral density (PSD) for an indicator parameter need only be compared to reference profiles of the power spectral density for that indicator parameter at certain nodes or combinations of operating parameters. As an example, if an engine of a marine propulsion system had never been operated above a speed of 5000 RPM, hypothetically, it would not be wise to determine the proper or improper operation of an indicator parameter with data obtained at that seldom used engine speed. Furthermore, if the engine of a marine propulsion system is seldom operated above 400 ft lbs. of torque, it would similarly be unwise to make any decisions regarding the proper or improper operation of an indicator parameter at that load. More simply stated, it is not wise to make decisions regarding the proper or improper operation of an indicator parameter at operating conditions that are not commonly used ones for the marine propulsion system or other apparatus being monitored. In order to further perfect these techniques described above, the present invention selects one or more operating characteristics and records the time at which the apparatus is operated at the various combinations of those operating characteristics. For example, FIG. 19 shows a time profile for the operating conditions of engine speed, measured in RPM, and the load on the engine measured as foot-pounds of torque. The surface plot of FIG. 19 represents the results of this effort. As can be seen in FIG. 19, the most common operating condition of the apparatus is in the region of 3000 RPM and 400 ft lbs. of torque. The second most common operating domain is in the region between 3000 and 4000 RPM and between 0 and 100 ft lbs. of torque.

Figure 20:
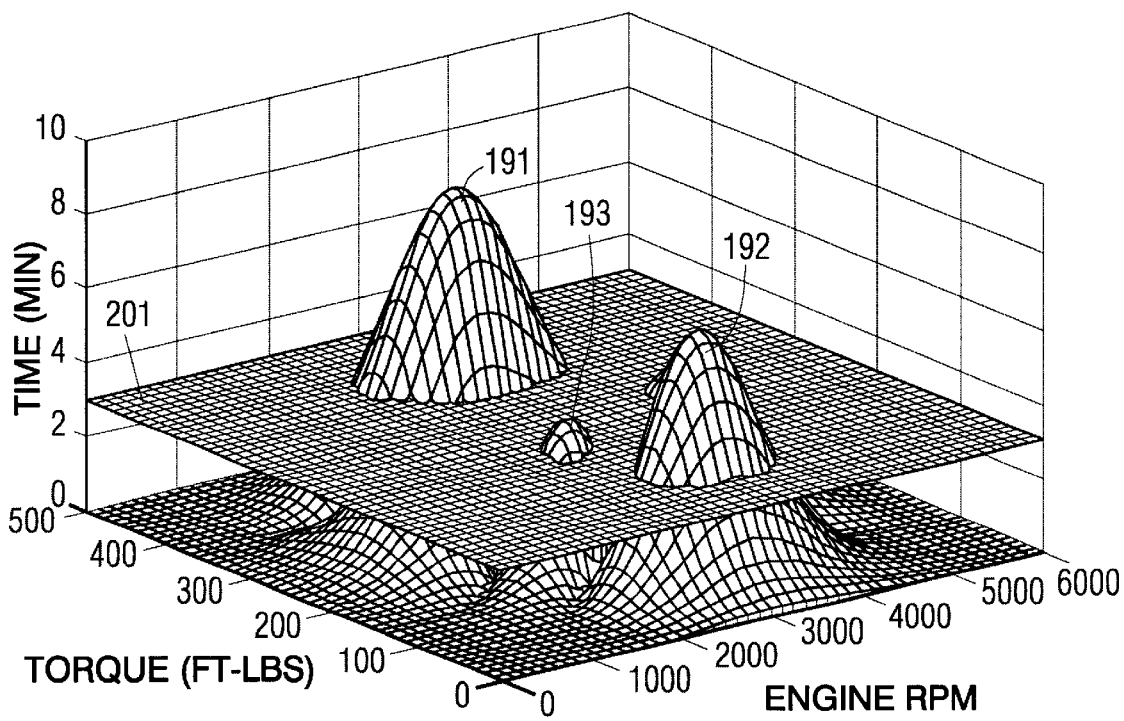
FIG. 20 shows the three dimensional profile of FIG. 19 with a threshold plane included.

With continued reference to FIG. 19, it can be seen that the subject engine had not been operated significantly at engine speeds less than 1000 RPM or greater than 5000 RPM. The present invention contemplates the use of a time threshold magnitude to determine whether or not sufficient usage of the apparatus at the particular combination of operating conditions has occurred. FIG. 20 shows the application of a threshold level of three minutes represented by the plane identified by reference numeral 201. When this threshold magnitude is applied to the surface represented in FIG. 19, only three localized operating conditions exceed the threshold. The largest peak 191 clearly exceeds the threshold. Another peak 192 also clearly exceeds the threshold. The third peak 193 also exceeds the threshold 201, but by a lesser degree. According to one preferred embodiment of the present invention, only data representing the operating conditions coincident with the three peaks shown in FIG. 2 would be used in the comparison represented by functional block 188 in FIG. 18. All other regions of the operating conditions of the apparatus have insufficient usage durations to qualify them for the purpose of being used to actually determine the reference power spectral density profile which, as described above, is used as a template to determine the acceptable of subsequently taken power spectral densities. As the apparatus is continually operated, other peaks in the surface shown in FIG. 19 will develop and grow beyond the threshold represented by plane 201.

If the present invention is monitoring a marine propulsion system, the micro-processor would continually measure the engine speed and the load on the engine to determine where in FIG. 19 the operating time should be accumulated. The power spectral densities for various indicator parameters would be measured and stored by the micro-processor as the various operating nodes grow in intensity as peaks in FIG. 19. It is assumed that many combinations of operating characteristics, measured by engine speed and engine load will occur only rarely and may never achieve the threshold magnitude 201. The present invention contemplates this and assumes that any particular marine propulsion system will experience an operational history that comprises numerous nodes, such as peaks 191–193, in its commonly used areas of operating characteristics while experiencing very low usage rates at other operating characteristics. By using a methodology as described above in conjunction with FIGS. 19 and 20, the present invention is able to use actual operational data developed from actual operating results for indicator parameters of the apparatus. This precludes the necessity of using artificial parameters that may or may not be applicable for any particular system. The present invention uses actual operational history to determine what the normal operating range of an indicator parameter is for each particular marine propulsion system. It also monitors the usage time at each of the combinations of operating parameters to make sure that the reference magnitudes are determined based on many repeated samples at operating conditions that are normal for the apparatus. At later times, after the several operational peaks, 191–193, are developed, the micro-processor only uses reference power spectral densities, or integrals thereof, determined for those particular operational nodes.

Figure 21:
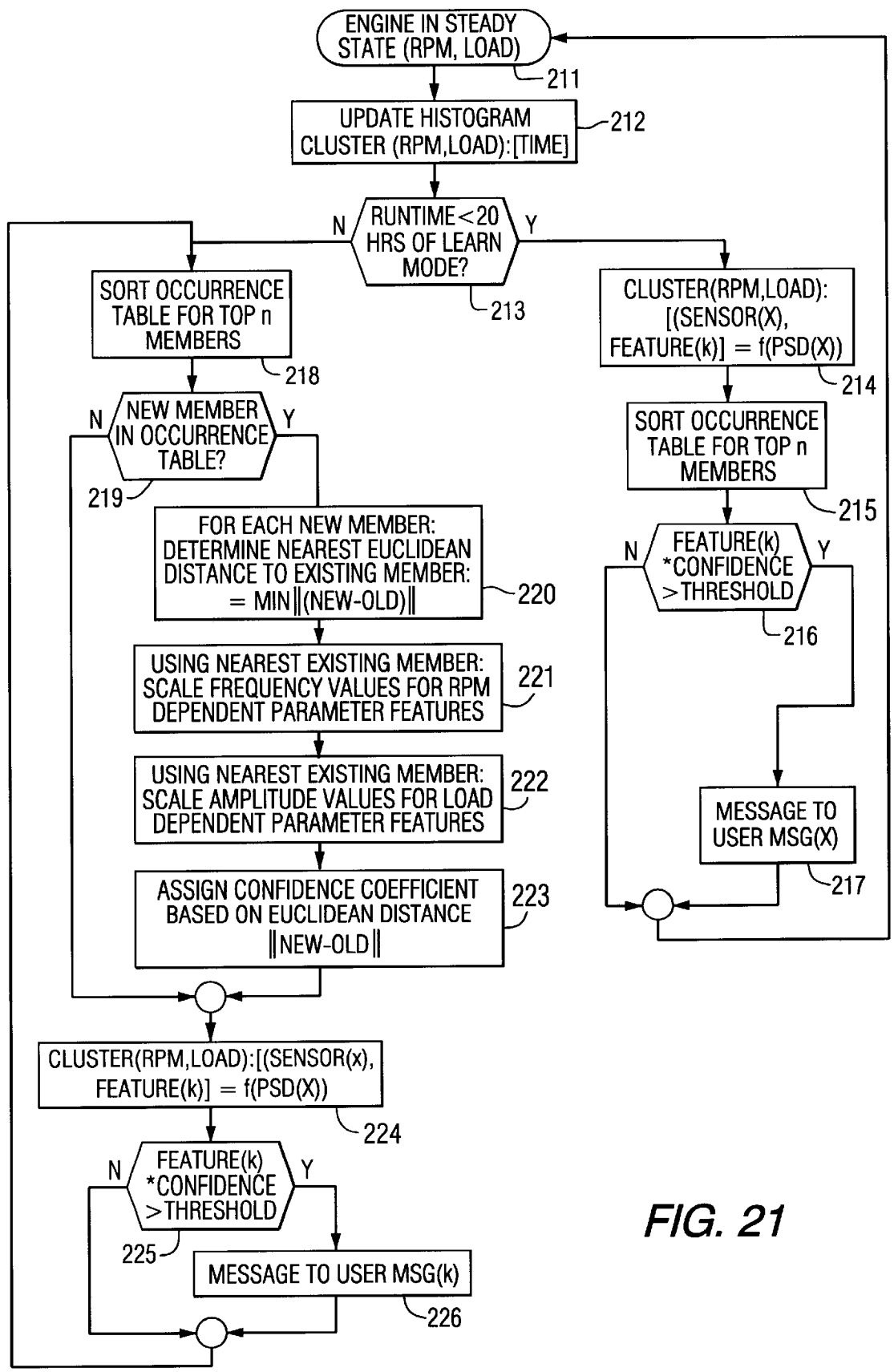
FIG. 21 is a flow chart of the method of one of the preferred embodiments of the present invention.

FIG. 21 shows a flow chart that can be used by a micro-processor to perform the steps of the present invention as described above in conjunction with FIGS. 19 and 20. The flow chart begins by assuring that the engine is in a steady state, at least with regards to engine speed and engine load. This is provided at functional block 211. The histogram cluster, as represented by FIG. 19, is updated at functional block 212 and a determination is made at functional block 213 whether or not a total of 20 hours of learning mode has elapsed. If the run time is less than 20 hours, a power spectral density reading is taken at functional block 214, a table of this current PSD and previously monitored PSD's are sorted at functional block 215 and a determination is made at functional block 216 to determine whether or not the most recently taken data exceeds a preselected threshold. If it does, a message is provided to the user at functional block 217 and if it does not, the system returns to functional block 211. If the run time is greater than 20 hours, as determined by functional block 213, the previously taken power spectral densities are sorted at functional block 218 and it is determined whether or not a new combination of operational characteristics has occurred. For example, if the engine is detected as operating at an engine speed and an engine load that had not before occurred, as determined by functional block 219, functional blocks 220, 221, 222, and 223 are performed to recognize the existence of a new set of operating characteristics and making sure that the system correctly logs that new occurrence into the existing database. The newly taken power spectral density is then stored, at functional block 224 and a comparison is made at functional block 225 to a preselected threshold. If the comparison shows that the threshold has been exceeded, a message is provided to the user at functional block 226 and the system returns to functional block 218.

Several embodiments of the present invention have been described above. One embodiment relates to a method for characterizing the operation of an apparatus. This is described above in conjunction with FIGS. 19, 20, and 21. It comprises the steps of monitoring the magnitude of a first operating condition of an apparatus, which can be engine speed or engine load or any other operating condition that relates to a preselected indicator parameter. The indicator parameter is periodically measured during a time when the apparatus is operating at the first magnitude of the first operating condition. For example, the power spectral density or integral of a power spectral density of a signal obtained from a accelerometer can be taken and stored as a function of a first operating condition which can be, for example, 3000 RPM at 300 ft lbs. of torque. The engine speed and engine load combine to identify a particular operating condition and the measurement of the indicator parameter is stored as a function of that particular combination for later reference. A plurality of these measurements of the indicated parameter are stored and used to determine a reference magnitude of the first indicator parameter. As an example, a plurality of these measurements of the first indicator parameter can be averaged to calculate the reference magnitude. Alternatively, they can be used in a regression formula to determine the norm of the plurality of readings. Other mathematical methods can also be used to select a reference magnitude from the plurality of measured magnitudes of the indicator parameter. The indicator parameter, as described above, can be a power spectral density or the integral of a power spectral density for any one of a number of different signals, including an accelerometer output, the output of a pressure sensor, or a voltage output from a system such as an ignition system. The reference magnitude is stored by the present invention for later comparison to subsequent readings. The present invention also compares the accumulative duration of time to a predetermined threshold magnitude. The accumulated duration of time can include all operating times at all operating conditions or, alternatively, it can include a predetermined threshold of time at the particular operating condition defined by the current engine speed and engine load. The difference between the most recently taken magnitude of the indicator parameter and the stored reference magnitude of the indicator parameter is then calculated. If this difference exceeds a preselected value, a signal output can be provided to warn an operator of this occurrence.

The present invention also contemplates the use of a particular frequency range of a power spectral density for purposes of comparing a reference magnitude to a subsequent value of the indicator parameter.

Although the present invention has been described with particular specificity and illustrated to describe several preferred embodiments, it should be understood that other embodiments and variations thereof are also within its scope.

What is claimed is:

1. Apparatus for prognosticating a condition of a marine propulsion system, comprising:

means for determining a reference magnitude of an indicator parameter under a first set of preselected operating conditions;

means, connected in signal communication with said determining means, for storing said reference magnitude of an indicator parameter;

means for measuring a current magnitude of said indicator parameter under said first set of preselected operating conditions, said current magnitude being measured subsequent to said reference magnitude being determined;

means, connected in signal communication with said storing means, for comparing said reference and current magnitudes; and means, connected in signal communication with said comparing means, for detecting a change in said condition of said marine propulsion system.

2. A method for prognosticating a condition of a apparatus, comprising:

determining a reference magnitude of an indicator parameter under a first set of preselected operating conditions, said apparatus being a marine propulsion system;

storing said reference magnitude of an indicator parameter;

measuring a current magnitude of said indicator parameter under said first set of preselected operating conditions, said current magnitude being measured subsequent to said reference magnitude being determined;

comparing said reference and current magnitudes; and detecting a change in said condition of said apparatus as a function of said comparing step.

3. The method of claim 2, further comprising:

repeating said measuring, comparing, and detecting steps at a predetermined frequency.

4. The method of claim 2, further comprising:

determining said reference magnitude of each of a plurality of indicator parameters under an associated first set of preselected operating conditions for each of said plurality of indicator parameters;

storing said reference magnitude of each of said plurality of indicator parameters;

measuring said current magnitude of each of said plurality of indicator parameters under said associated first set of preselected operating conditions, said current magnitude of each of said plurality of indicator parameters being measured subsequent to said reference magnitude of each of said plurality of indicator parameters being determined;

comparing each of said reference magnitudes to its associated current magnitude; and detecting a change in said condition of said apparatus as a function of said comparing step.

5. The method of claim 2, wherein:

said indicator parameter is an output from an accelerometer.

6. The method of claim 2, wherein:

said indicator parameter is an output from a fuel pressure sensor.

7. The method of claim 2, wherein:

said indicator parameter is an output from an ignition system.

8. The method of claim 2, wherein:

said indicator parameter is an output from an air pressure sensor.

9. The method of claim 2 wherein:

said marine propulsion system comprises a gear case, a fuel supply system, an ignition system, an oil delivery system, and an air delivery system.

10. The method of claim 2, wherein:

said indicator parameter is a power spectral density of a preselected variable.

11. The method of claim 2, wherein:

said indicator parameter is a plurality of values representing power spectral density of a preselected variable for a plurality of frequencies.

12. The method of claim 2, wherein:

said indicator parameter is the integral of a power spectral density of a preselected variable.

13. The method of claim 2, wherein:

said first set of preselected operating conditions comprise a magnitude of the speed of an engine and a magnitude of a load on said engine.

14. A method for prognosticating a condition of a apparatus, comprising:

determining a reference magnitude of each of a plurality of indicator parameters under an associated first set of preselected operating conditions for each of said plurality of indicator parameters;

storing said reference magnitude of each of said plurality of indicator parameters;

measuring a current magnitude of each of said plurality of indicator parameters under said associated first set of preselected operating conditions, said current magnitude of each of said plurality of indicator parameters being measured subsequent to said reference magnitude of each of said plurality of indicator parameters being determined;

comparing each of said reference magnitudes to its associated current magnitude;

detecting a change in said condition of said apparatus as a function of said comparing step; and repeating said measuring, comparing, and detecting steps at a predetermined frequency.

15. The method of claim 14, wherein:

said apparatus is a marine propulsion system which comprises a gear case.

16. The method of claim 14, wherein:

said indicator parameter is a power spectral density of a preselected variable.

17. The method of claim 14, wherein:

said indicator parameter is a plurality of values representing power spectral density of a preselected variable for a plurality of frequencies.

18. The method of claim 14, wherein:

said indicator parameter is the integral of a power spectral density of a preselected variable.

19. The method of claim 14, wherein:

said first set of preselected operating conditions comprise a magnitude of the speed of an engine and a magnitude of a load on said engine.

* * * * *